(12) United States Patent
Netravali et al.

(10) Patent No.: US 9,790,350 B2
(45) Date of Patent: Oct. 17, 2017

(54) CROSSLINKED NATIVE AND WAXY STARCH RESIN COMPOSITIONS AND PROCESSES FOR THEIR MANUFACTURE

(71) Applicant: CORNELL UNIVERSITY, Ithaca, NY (US)

(72) Inventors: Anil N. Netravali, Ithaca, NY (US); Trina Ghosh Dastidar, Creve Coeur, MO (US)

(73) Assignee: CORNELL UNIVERSITY, Ithaca, NY (US)

( * ) Notice: Subject to any disclaimer, the term of this patent is extended or adjusted under 35 U.S.C. 154(b) by 0 days.

(21) Appl. No.: 14/418,940

(22) PCT Filed: Aug. 1, 2013

(86) PCT No.: PCT/US2013/053224
§ 371 (c)(1),
(2) Date: Jan. 31, 2015

(87) PCT Pub. No.: WO2014/022666
PCT Pub. Date: Feb. 6, 2014

(65) Prior Publication Data
US 2015/0203667 A1 Jul. 23, 2015

Related U.S. Application Data

(60) Provisional application No. 61/678,279, filed on Aug. 1, 2012, provisional application No. 61/678,297, filed on Aug. 1, 2012.

(51) Int. Cl.
*C08L 3/04* (2006.01)
*C08B 31/00* (2006.01)
*C08J 3/24* (2006.01)

(52) U.S. Cl.
CPC .............. *C08L 3/04* (2013.01); *C08B 31/003* (2013.01); *C08J 3/24* (2013.01); *C08J 2303/04* (2013.01); *C08L 2205/16* (2013.01)

(58) Field of Classification Search
CPC ........................................................ C08L 3/04
See application file for complete search history.

(56) References Cited

U.S. PATENT DOCUMENTS 4,339,331 A * 7/1982 Lim ...................... B03D 1/008
209/167
5,981,739 A 11/1999 Anderson et al.
(Continued)

FOREIGN PATENT DOCUMENTS

FI WO 2011042610 A1 * 4/2011 .............. C08L 97/02
WO 2009/045022 A2 4/2009
(Continued)

OTHER PUBLICATIONS

Yang, Charles Q., "Infrared spectroscopy studies of the effects of the catalyst on the ester cross-linking of cellulose by poly(carboxylic acids)," *Journal of Applied Polymer Science*, 50(12):2047-2053 (1993).
(Continued)

*Primary Examiner* — Melvin C Mayes
*Assistant Examiner* — Stefanie Cohen
(74) *Attorney, Agent, or Firm* — FisherBroyles, LLP; Andrew K. Gonsalves, Esq.

(57) ABSTRACT

The present invention relates to an enhanced starch resin composition, methods of making the enhanced starch resin composition using environmentally benign, water-based processes, and products produced using the enhanced starch resin composition. The enhanced starch resin composition comprises a native starch and/or a waxy starch crosslinked with a multi-functional polycarboxylic acid. The starch resin
(Continued)

composition is formed by a water-based reaction comprising using a non-toxic, water-soluble catalyst to catalyze esterification of the native starch and/or the waxy starch with the multi-functional polycarboxylic acid, thereby yielding a crosslinked starch resin composition having at least one enhanced mechanical property and/or reduced moisture absorption as compared to the native starch and/or the waxy starch.

36 Claims, 15 Drawing Sheets

(56) References Cited

U.S. PATENT DOCUMENTS

| | | | |
|---|---|---|---|
| 7,008,457 B2 | 3/2006 | Sivik et al. | |
| 2003/0029585 A1 | 2/2003 | Jewell | |
| 2003/0037891 A1 | 2/2003 | Jewell | |
| 2004/0096569 A1 | 5/2004 | Barkalow et al. | |
| 2004/0158056 A1* | 8/2004 | Hiemstra | C08B 31/003 536/47 |
| 2010/0120943 A1 | 5/2010 | Narayan et al. | |
| 2012/0319029 A1* | 12/2012 | Jaffrennou | C03C 25/32 252/62 |

FOREIGN PATENT DOCUMENTS

| | | |
|---|---|---|
| WO | 2011/042610 A1 | 4/2011 |
| WO | 2012/059343 A1 | 5/2012 |

OTHER PUBLICATIONS

Yang et al., "Evaluating Ester Crosslinking of Cotton Fabric by a Polycarboxylic Acid Using Acid-Base Titration," *Textile Research Journal*, 70(7):615-620 (2000) (Abstract).

Yang, Charles Q., "FTIR Spectroscopy Study of Ester Crosslinking of Cotton Cellulose Catalyzed by Sodium Hypophosphite," *Textile Research Journal*, 71(3):201-206 (2001) (Abstract).

Seidel et al., "Influence of the Cross-linking Agent on the Gel Structure of Starch Derivatives," *Starch—Stärke*, 53(7):305-310 (2001) (Abstract).

Sauperl et al., "Differences Between Cotton and Viscose Fibers Crosslinked with BTCA," *Textile Research Journal*, 80(4):383-392 (2010) (published online Sep. 18, 2009) (Abstract).

Yang et al., "Infrared Spectroscopy Studies of the Cyclic Anhydride as the Intermediate for the Ester Crosslinking of Cotton Cellulose by Polycarboxylic Acids. III. Molecular Weight of a Crosslinking Agent," *J. Polymer Science. Part A: Polymer Chemistry*, 35:557-564 (1997).

Morris et al., "FT-IR Determination of Degree of Esterification in Polycarboxylic Acid Cross-Link Finishing Cotton," *Cellulose* 2:31-39 (1995).

Morris et al., "Interaction of meso-1,2,3,4-Butanetetracarboxylic Acid with Phosphorus-Containing Catalysts for Esterification Cross-Linking of Cellulose," *Ind. Eng. Chem. Res.* 35:950-953 (1996), Oct. 11, 2016.

Dastidar et al., "Green Crosslinking of Native Starches with Malonic Acid and Their Properties," *Carbohydrate Polymers*, 90:1620-1628 (2012).

International Search Report and Written Opinion issued in PCT/US2013/053224, mailed Nov. 8, 2013.

* cited by examiner ated as WO 2014/
CROSSLINKED NATIVE AND WAXY STARCH RESIN COMPOSITIONS AND PROCESSES FOR THEIR MANUFACTURE

CROSS-REFERENCE TO RELATED APPLICATIONS

This application is a U.S. National Phase filing under 35 U.S.C. §371 of International Application No. PCT/US2013/053224, filed Aug. 1, 2013, and published as WO 2014/022666 A1 on Feb. 6, 2014, which claims benefit of priority from U.S. Provisional Patent Application Ser. No. 61/678,279, filed Aug. 1, 2012, and U.S. Provisional Patent Application Ser. No. 61/678,297, filed Aug. 1, 2012. The entire contents of each of the prior applications are incorporated herein by reference in their entirety.

FIELD OF THE INVENTION

The present invention relates to an enhanced starch resin composition, methods of making the enhanced starch resin compositions using environmentally benign, water-based processes, and products produced using the enhanced starch resin composition.

BACKGROUND OF THE INVENTION

Starches, proteins and cellulose together form an important and a large part of the available biomass and have received considerable attention because of their low cost, biodegradability, annually renewal and abundant supply throughout the world (Arvanitoyannis, Kalichevsky, Blanshard & Psomiadou, 1994; vanSoest & Essers, 1997). These biomaterials can be used as suitable substitutes for petroleum based products, particularly if their properties can be matched with those of petroleum based polymers. Starch is composed of two polymers of D-glucopyranose; amylose and amylopectin. Amylose is formed by glucose units joined by 1,4 glycosidic linkages and amylopectin is formed by glucose units joined by 1,4- as well as 1,6-glycosidic linkages. While amylose is a low molecular weight polymer consisting of 1000-10,000 glucose units and is linear, amylopectin is a larger branched macromolecule with degree of polymerization (DP) sometimes exceeding one million (Du, Jia, Xu & Zhou, 2007). Starch based materials and composites have been used in highly sophisticated applications including biomaterials for tissue engineering (Lan et al., 2010; Pashkuleva, Azevedo & Reis, 2008; Pashkuleva, Marques, Vaz & Reis, 2005; Reddy & Yang, 2009; Santos et al., 2009).

Native starches have been crosslinked using polycarboxylic acids such as citric acid, polyphosphates such as sodium trimetaphosphate, sodium tripolyphosphate as well as epichlorohydrin, phosphorus oxychloride and 1,2,3,4-diepoxybutane (Ayoub & Rizvi, 2009; Chen & Wang, 2006; Jyothi, Moorthy & Rajasekharan, 2006; Mao, Wang, Meng, Zhang & Zheng, 2006; Passauer, Liebner & Fischer, 2009; Reddy & Yang, 2010). Carboxymethylated starch with a DS of 0.45 has been further crosslinked using malic, tartaric, citric, malonic, succinic, glutaric and adipic acid to synthesize crosslinked hydrogels (Seidel, Kulicke, He, Hartmann, Lechner & Lazik, 2001). Crosslinking is a thermosetting modification that interconnects the starch molecules by covalent bonding, thus it not only increases the molecular weight but also enhances the mechanical properties. Water stability of starches is improved by crosslinking while at the same time the swelling is reduced (Reddy & Yang, 2010). Further, crosslinked films also show higher thermal stability and resistance to degradation than non-crosslinked films (Reddy & Yang, 2010).

Corn, a cereal starch containing 27% amylose, and potato, a tuber starch containing 24% amylose, show many differences in functional properties under similar processing conditions owing to their different origins (Mishra & Rai, 2006). The degree of amylose content influences the reactivity of corn and potato starches. Among other constituents lipid contents of the two starches are different; 0.32% in PS and 1.22% in CS (Mishra & Rai, 2006). Lipids form complex with the amylose in CS which leads to more rigid structure and high turbidity. PS also has higher content of phosphate ester groups bound to the native starch, which has been claimed to cause lower pasting temperature, higher viscosity and improved clarity (Mishra & Rai, 2006). PS granules are also fragile in nature and have a different crystal structure (B-type) as compared to CS (A-type crystal structure)(Mishra & Rai, 2006).

The majority of the conventional plastics and composites used today are derived from petroleum, a non-sustainable resource. Many a times the manufacturing processes involved could also be harmful to the nature.[2] Most of the plastics and composites cannot be easily collected, recycled and/or reused. As a result, more than 60 billion pounds of the plastics that are discarded every year in the United States of America, at the end of their life, end up in the landfills.[2] Plant based natural polymers offer a sustainable, yearly renewable and environment friendly solution to the current problem of plastic waste.[3] Natural polymers such as native starch have been chemically and physically modified to form thermoplastic or crosslinked resins with enhanced film forming properties.[4] Starch is a polysaccharide composed of two polymers of glucopyranose-linear amylose molecule with (1-4) glycosidic linkages and branched amylopectin molecule with (1-6) glycosidic linkages. While amylose is a low molecular weight polymer consisting of 1000-10,000 glucose units and is linear, amylopectin is a larger branched macromolecule with degree of polymerization (DP) sometimes exceeding one million.[5]

There is a need for environmental friendly and non-toxic composites for use in a wide variety of applications, as well as processes for the manufacture of resins used to make the composites, where the processes themselves are also environmental friendly (e.g., water-based).

The present invention is directed toward overcoming these and other deficiencies in the art.

SUMMARY OF THE INVENTION

The present invention relates to an enhanced starch resin composition, methods of making the enhanced starch resin composition using environmentally benign, water-based processes, and products produced using the enhanced starch resin composition. In various embodiments, the enhanced starch resin composition provides an environmentally friendly and green composition for use in numerous applications.

In one aspect, the present invention provides an enhanced starch resin composition comprising a native starch and/or a waxy starch crosslinked with a multi-functional polycarboxylic acid. The starch resin composition is formed by a water-based reaction comprising using a non-toxic, water-soluble catalyst to catalyze esterification of the native starch and/or the waxy starch with the multi-functional polycarboxylic acid, thereby yielding a crosslinked starch resin composition having at least one enhanced mechanical property and/or reduced moisture absorption as compared to the native starch and/or the waxy starch. In particular embodiments, the enhanced starch resin composition further comprises an additive selected from the group consisting of a plasticizer, a reinforcement agent, and combinations thereof.

In another aspect, the present invention relates to a method of making an enhanced starch resin composition. This method involves the following steps: providing a gelatinized starch mixture comprising gelatinized native and/or waxy starch; precuring the gelatinized starch mixture with a sufficient amount of a multi-functional polycarboxylic acid in the presence of a sufficient amount of a non-toxic, water-soluble catalyst effective to catalyze esterification of the native starch and/or the waxy starch with the multi-functional polycarboxylic acid, thereby yielding a precured starch mixture; and curing the precured starch mixture at a sufficient temperature for a sufficient period of time to yield a crosslinked starch resin composition comprising the native starch and/or the waxy starch crosslinked with the multi-functional polycarboxylic acid, wherein said crosslinked starch resin composition has at least one enhanced mechanical property and/or reduced absorption as compared to the native starch and/or the waxy starch.

In one embodiment, this method further comprises drying the precured starch mixture prior to performing the curing step.

In another embodiment, this method further comprises, after curing the precured starch mixture, washing the cured crosslinked starch resin composition with a sufficient amount of water for a sufficient amount of time to remove or substantially remove any non-reacted multi-functional polycarboxylic acid and non-toxic, water-soluble catalyst.

In yet another embodiment, this method further comprises mixing an additive with the gelatinized starch mixture prior to performing the precuring, wherein the additive is selected from the group consisting of a plasticizer, a reinforcement agent, and combinations thereof.

With regard to the various aspects, the present invention provides, inter alia, facile, relatively inexpensive, water-based processing conditions for preparing crosslinked starch resin based films. The processing conditions as provided is effective for manufacturing and obtaining starch resin compositions and associated products having enhanced mechanical properties and reduced moisture absorption.

In accordance with aspects of the present invention, a 'green' water-based process is provided to crosslink starches to achieve desired higher mechanical properties as well as lower hydrophilicity. In certain embodiments, corn (cereal) and potato (tuber) starches are used, although any other starch can be used. In certain embodiments of the present invention, malonic acid (MA), a green, plant-based, water-soluble, sustainable, and relatively inexpensive polycarboxylic acid, can be used as the crosslinker. In certain other embodiments of the present invention, 1,2,3,4-Butanetetracarboxylic acid (BTCA), can be used as the crosslinker, and more particularly in the presence of a catalyst. In the various embodiments of the method of the present invention, the esterification reaction can be designed to be carried out under aqueous, non-toxic, and normal environmental conditions. In various embodiments, the method has replaced commonly used toxic organic solvents and complicated reaction set ups involving multiple washing steps commonly used for such reactions to obtain a high degree of substitution of starch ester. As provided above and herein, in various embodiments, the present invention provides, for the first time, the use of malonic acid or BTCA to crosslink native starches using a water-based technique.

These and other objects, features, and advantages of this invention will become apparent from the following detailed description of the various aspects of the invention taken in conjunction with the accompanying drawings.

BRIEF DESCRIPTION OF THE DRAWINGS

For the purpose of illustrating aspects of the present invention, there are depicted in the drawings certain embodiments of the invention. However, the invention is not limited to the precise arrangements and instrumentalities of the embodiments depicted in the drawings. Further, as provided, like reference numerals contained in the drawings are meant to identify similar or identical elements.

DETAILED DESCRIPTION OF THE INVENTION

Figure 1:
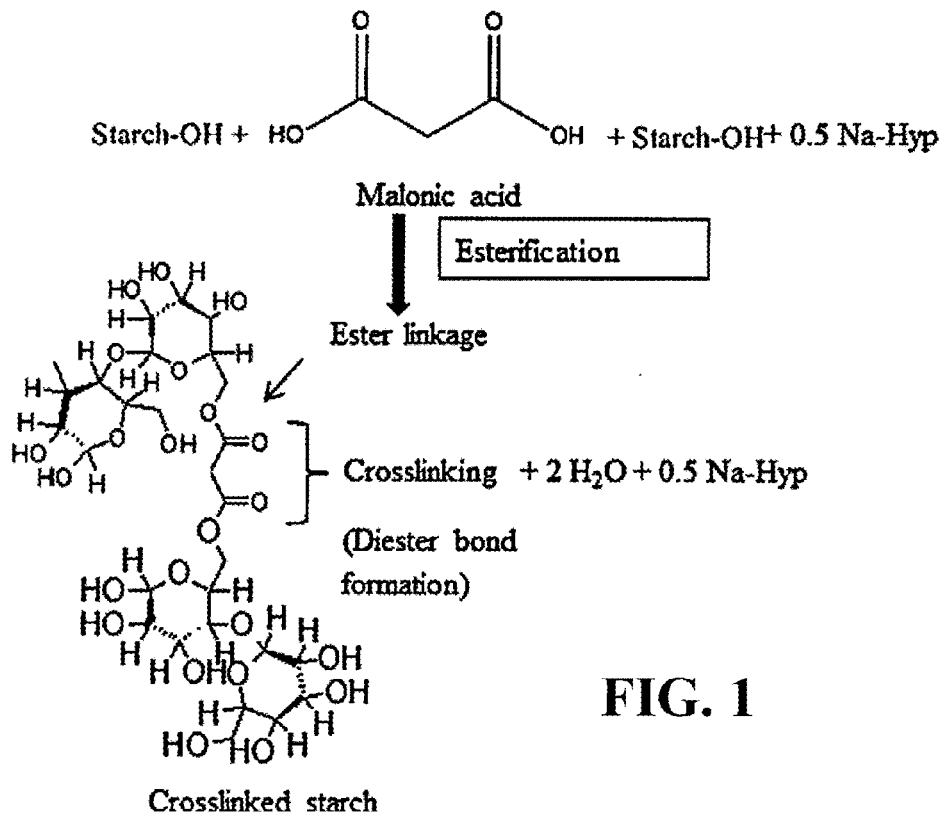
FIG. 1 is an illustration of a reaction scheme for crosslinking starch with malonic acid (MA) via an esterification reaction in accordance with one embodiment of the present invention.

The present invention generally relates to, inter alia, enhanced starch resins comprising crosslinked native and/or waxy starches, methods of producing the enhanced starch resins using environmentally benign, water-based processes, and composites and other products produced with the enhanced starch resins. In various embodiments, the enhanced starch resin composition provides an environmentally friendly and green composition for use in numerous applications.

Terminology and Definitions

The following terms are provided with corresponding definitions which are to be understood in the context of the present application. Any term that is not explicitly defined shall be considered to have a meaning understood by a person of ordinary skill in the art in view of the entire teaching of the specification.

The term "green" as used herein to refer to organic compositions means compositions that are generally non-toxic, biodegradable organic, and renewable. It may also be taken as non-petroleum-based. It would be understood that certain inorganic minerals such as "nanoclay" while not biodegradable are non-toxic and benign and can be used without adverse impact to the ecosystem may also be considered, "green." In addition, they are used in very small amounts.

The term "biodegradable" is used herein to mean degradable over time by water and/or enzymes found in nature (e.g., in compost), without harming the environment.

The term "curing" is generally used herein to describe subjecting the composition of the present invention to conditions of temperature and pressure effective to crosslink.

As used herein the measurement "percentage by weight," "weight percent," "weight ratio" or similar terms, generally refer to the proportion of weight of a measured component compared to the total weight of all of the ingredients or components of the composition. However, as used in this application to describe a resin composition that can be suspended, mixed or dissolved in a liquid carrier such as water, it is understood that the measurement "percentage by weight," "weight percent," "weight ratio" or similar terms refers the proportion of dry weight of a measured component compared to the total dry weight of the composition absent the liquid carrier that is removed or evaporated from the composition in the curing process.

As used herein, all ranges defined by a top and bottom end numerical value (e.g., percentage, MPa, temperature, etc.) are meant to encompass all values including and falling within the corresponding top and bottom end numerical values. For example, if a pressure range is defined as being between 0.25 MPa and about 10 MPa, all MPa values including and falling between 0.25 MPa and 10 MPa are contemplated as being included in that range.

Enhanced Starch Resin Compositions

In one aspect, the present invention provides an enhanced starch resin composition comprising a native starch and/or a waxy starch crosslinked with a multi-functional polycarboxylic acid. The starch resin composition is formed by a water-based reaction comprising using a non-toxic, water-soluble catalyst to catalyze esterification of the native starch and/or the waxy starch with the multi-functional polycarboxylic acid, thereby yielding a crosslinked starch resin composition having at least one enhanced mechanical property and/or reduced moisture absorption as compared to the native starch and/or the waxy starch. In particular embodiments, the enhanced starch resin composition further comprises an additive selected from the group consisting of a plasticizer, a reinforcement agent, or combinations thereof.

As set forth above and herein, the enhanced starch resin composition of the present invention has at least one enhanced mechanical property and/or reduced moisture absorption as compared to the native starch and/or the waxy starch. For example, the enhanced starch resin composition of the present invention includes, without limitation, at least one enhanced mechanical property selected from the group consisting of increased Young's modulus, increased toughness, and increased fracture stress. Techniques and tests to analyze and compare these properties of the enhanced starch resin composition against the corresponding non-enhanced starch resin compositions are well known by those of ordinary skill in the art. Some of these techniques and tests are described herein.

In one embodiment, the native starch and/or waxy starch is present in an amount ranging from about 50 percent (%) and about 100% by weight. In certain embodiments, the range can vary depending on the application. For example, the viscosity of the enhanced starch resin and consequently the film thickness (of the film made with the starch resin) may be controlled by monitoring the solids content of starch in water. Adding water can reduce the viscosity and vice versa. In various embodiments, the other 50% may be protein or other biodegradable resins.

The native starch and/or waxy starch can be from any plant source that contains starch. In particular embodiments, the plant source for the native and/or waxy starch is a cereal, a tuber, or combinations thereof. Suitable examples of cereal plant sources for the native and/or waxy starch include, without limitation, maize, rice, wheat, sorghum, and combinations thereof. Suitable examples of tuber plant sources for the native and/or waxy starch include, without limitation, potato, sweet potato, tapioca, yam, cassava, and combinations thereof.

In one embodiment, the multi-functional polycarboxylic acid is present in the enhanced starch resin composition of the present invention in an amount ranging from about 10% and about 50% by weight. One of ordinary skill can readily understand that the percentage of multi-functional polycarboxylic acid can depend on the ratio of carboxyl groups in the acid to primary hydroxyl groups on starch. The multi-functional polycarboxylic acid can include any carboxylic acid having at least two carboxyl groups. Further, the multi-functional polycarboxylic acid is preferably water-soluble and non-toxic. Suitable examples of particular multi-functional polycarboxylic acids for use in the enhanced starch resin composition of the present invention can include, without limitation, malonic acid (MA) and 1,2,3,4-butanetetracarboxylic acid (BTCA). Other suitable examples of particular multi-functional polycarboxylic acids for use in the enhanced starch resin composition of the present invention can include, without limitation, succinic acid, glutaric acid, adipic acid, pimelic acid, oleic acid dimer, sebacic acid, suberic acid, azelaic acid, fumaric acid, 2,5-dimethyl adipic acid, cis-cyclohexane-1,2-dicarboxylic acid, trans-bicyclo [2.2.2] octane-2,3-dicarboxylic acid, trans-bicyclo[2.2.2]oct-5-ene-2,3-dicarboxylic acid, 1,14-tetradecanedicarboxy acid, 1,10-decanedicarboxylic acid, diglycolic acid, 3,3'-oxydipropionic acid, biphenyl-4,4'-dicarboxylic acid, p-phenylenedipropionic acid, pentane-1,3,5-tricarboxylic acid, benzene-1,3,5-tricarboxylic acid, and citric acid. Still further, in certain embodiments, the multi-functional polycarboxylic acid can include multi-functional polycarboxylic acids that may not be completely water-soluble and that may have some toxicity, including, without limitation, terephthalic acid, 2-bromobenzene-1,4-dicarboxylic acid, 2-chlorobenzene-1,4-dicarboxylic acid, isophthalic acid, naphthalene-1,4-dicarboxylic acid, naphthalene-1,5-dicarboxylic acid, nitroterephthalic acid, methylterephthalic acid, and 1,3,5-hexatriene-1,6-dicarboxylic acid.

In a particular embodiment, malonic acid (MA) is used as the multi-functional polycarboxylic acid. MA is a plant derived green dicarboxylic acid with a molecular weight of 104 g/mol that can react with the hydroxyl groups on the D-glucopyranose ring present in starch by forming ester bonds. FIG. 1 provides one embodiment of a reaction scheme using MA as the multi-functional polycarboxylic acid. MA is soluble in water at room temperature and was chosen as a crosslinker for starch since it is nontoxic and relatively inexpensive. In general, esterification reactions are carried out in organic solvents, require the use of toxic reagents and repeated washing of the end product by water and alcohol to remove excess organic solvents. An example is the acetylation of starch carried out by Garg and Jana (Garg & Jana, 2011) in the presence of acetic anhydride and pyridine.

Figure 2:
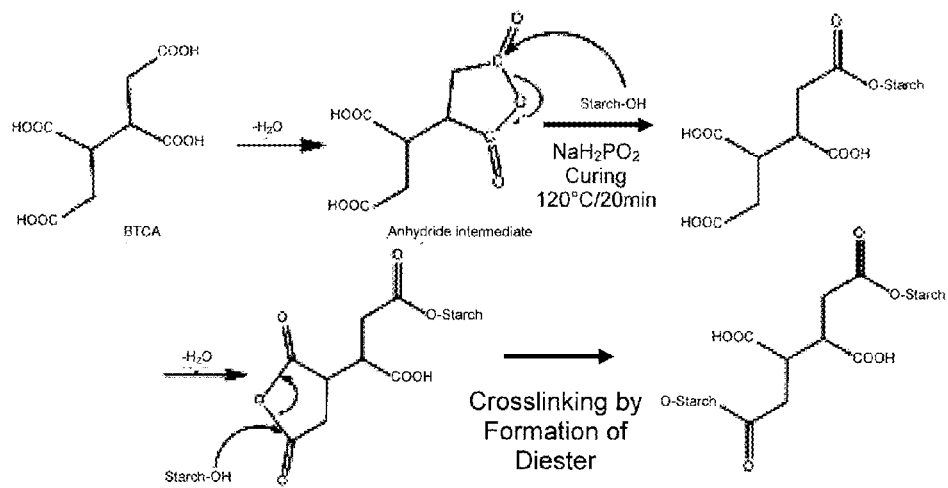
FIG. 2 is an illustration of a reaction scheme for crosslinking starch with 1,2,3,4-butanetetracarboxylic acid (BTCA) via an esterification reaction in accordance with one embodiment of the present invention.

In a particular embodiment, 1,2,3,4-butanetetracarboxylic acid (BTCA) is used as the multi-functional polycarboxylic acid. FIG. 2 provides one embodiment of a reaction scheme using BTCA as the multi-functional polycarboxylic acid.

In one embodiment, the non-toxic, water-soluble catalyst is added to catalyze the esterification reaction in an amount ranging from about 1% and about 40% based on the dry weight of the multi-functional polycarboxylic acid. The non-toxic, water-soluble catalyst can be any compound or composition that is effective for catalyzing the esterification reaction of the native starch and/or the waxy starch with the multi-functional polycarboxylic acid, while at the same time being non-toxic and water-soluble. Suitable examples of non-toxic, water soluble catalysts can include, without limitation, sodium hypophosphite monohydrate, sodium hypophosphite, sodium monobasic phosphate, sodium trimetaphosphite, and the like.

In other embodiments, the enhanced starch resin composition can further comprise an additive selected from the group consisting of a plasticizer, a reinforcement agent, or combinations thereof.

In a particular embodiment, the enhanced starch resin composition of the present invention further comprises a plasticizer. Without wishing to be bound by any particular theory, it is believed that the addition of a plasticizer increases the strength and rigidity of the composite by reducing the brittleness of the crosslinked starch. In some embodiments, the weight ratio of plasticizer-to-starch is about 1:20 to about 1:4. As used herein, all ratio ranges contemplate all ratios falling within the top and bottom ratio of each ratio range. In some embodiments, the ratio of starch to plasticizer is 4:1. Suitable plasticizers for use in the present invention can include, without limitation, hydrophilic or hydrophobic polyol. More particularly, suitable polyols for use as plasticizers in the present invention can include, without limitation, sorbitol, glycerol, glycol, mannitol, or combinations thereof. In still other embodiments, the plasticizer can include, without limitation, carboxyl methyl gum, carboxyl methyl starch and carboxy methyl tamarind, or a combination thereof.

Figure 17:
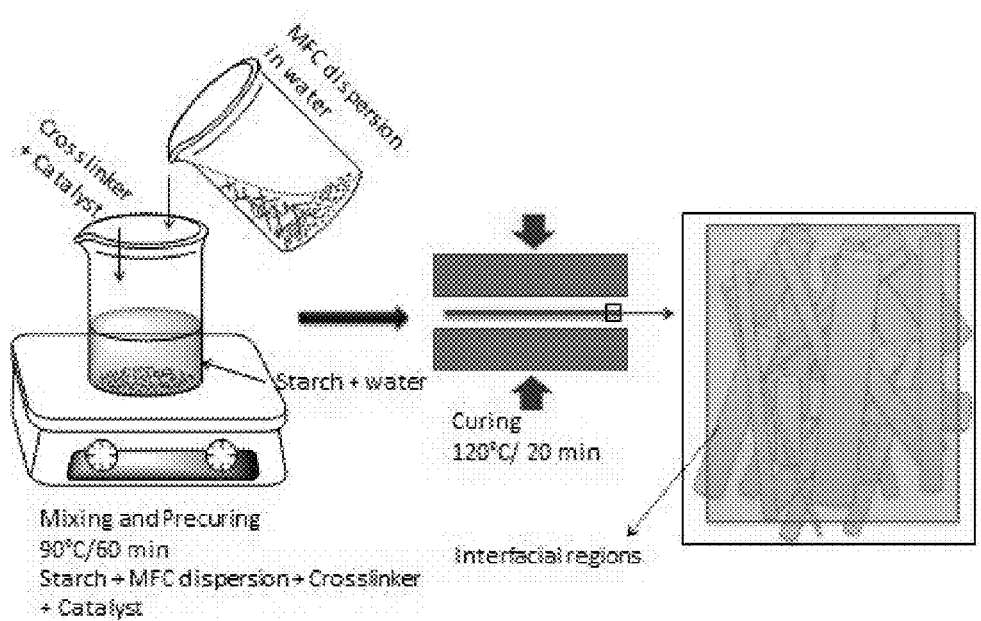
FIG. 17 is a schematic of one embodiment of a process for preparing an enhanced starch resin composition composite of the present invention, and particularly the fabrication of MFC-WMS (crosslinked) nanocomposite.

In a particular embodiment, the enhanced starch resin composition further comprises a reinforcement agent. Suitable reinforcement agents for use in the present invention can include, without limitation, nanoclay, microfibrillated cellulose (MFC), nanofibrillated cellulose (NFC), variety of whiskers, nanotubes, surface functionalized nanoparticles, metal oxide nanoparticles (e.g., iron oxide, silica, titania, zinc oxide catered to a specific application, etc.), or combinations thereof. In other embodiments, the reinforcement agent can include, without limitation, a green polysaccharide. In certain embodiments, it is important to ensure uniform dispersion of nanoparticles within the resin to obtain the best mechanical and physical properties. In the case of starch resins, the uniform dispersion may be obtained by high speed stirring, ultrasonications, and other methods known by those of ordinary skill in the art. FIG. 17 is a schematic of one embodiment of a process for preparing an enhanced starch resin composition composite of the present invention, and particularly the fabrication of MFC-WMS (crosslinked) nanocomposite.

In some embodiments, the weight ratio of starch-to-reinforcement agent in the enhanced starch resin composition of the present invention is about 20:1 to about 1:1.

Green Polysaccharides: In some embodiments, the reinforcement agent is a green polysaccharide. In some embodiments, the green polysaccharide is agar, gellan, gellan gum (Phytagel™), carageenan or a mixture thereof.

Gellan gum is commercially available as from Sigma-Aldrich Biotechnology. It is produced by bacterial fermentation and is composed of glucuronic acid, rhanmose and glucose, and is commonly used as a gelling agent for electrophoresis. Based on its chemistry, cured Phytagel™ is fully degradable. Gellan, a linear tetrasaccharide that contains glucuronic acid, glucose and rhamnose units, is known to form gels through ionic crosslinks at its glucuronic acid sites using divalent cations naturally present in most plant tissue and culture media. In the absence of divalent cations, higher concentration of gellan is also known to form strong gels via hydrogen bonding.

Nanoclay: In some embodiments, the reinforcement agent is clay. In other embodiments, the clay is nanoclay. In some embodiments, nanoclay has a dry particle size of 90% less than 15 microns. The composition can be characterized as green since the nanoclay particles are natural and simply become soil particles if disposed of or composted. Without being limited to a particular theory, it is believed that nanoclay does not take part in the crosslinking but is rather present as a reinforcing additive and filler. As used herein, the term "nanoclay" means clay having nanometer thickness silicate platelets. In some embodiments, nanoclay is natural clay such as montmorillonite. In other embodiments, nanoclay is selected from the group comprising fluorohectorite, laponite, bentonite, beidellite, hectorite, saponite, nontronite, sauconite, vermiculite, ledikite, nagadiite, kenyaite, and stevensite.

Cellulose: In some embodiments, the reinforcement agent is cellulose. In some embodiments, cellulose is a microfibrillated cellulose (MFC) or nanofibrillated cellulose (NFC). MFC is manufactured by separating (shearing) the cellulose fibrils from several different plant varieties. Further purification and shearing produces nanofibrillated cellulose. The difference between MFC and NFC is size (micrometer versus nanometer). The compositions are green because the MFC and NFC degrade in compost medium and in moist environments through microbial activity. Up to 60% MFC or NFC by weight (starch plus green strengthening agent basis) improves the mechanical properties of the composition significantly. The MFC and NFC do not take part in any crosslinking but rather are present as strengthening additives or filler. However, they are essentially uniformly dispersed in the biodegradable composition and, because of their size and aspect ratio, act as reinforcement.

It will be appreciated by those skilled in the art that a resin of the present invention also includes resins containing various combinations of reinforcement agents. For example only, in one embodiment the resin composition comprises an enhanced starch from 98% to 20% by weight starch (starch plus reinforcement agent basis) and from 2% to 80% by weight of reinforcement agent (starch plus reinforcement agent basis) wherein the reinforcement agent consists of from 1% to 65% by weight cured green polysaccharide and from 0.1% to 15% by weight nanoclay (starch plus nanoclay plus polysaccharide basis).

In another embodiment, the enhanced starch resin composition comprises a starch from 98% to 20% by weight starch (starch plus reinforcement agent basis) and from 2% to 80% by weight of reinforcement agent (starch plus reinforcement agent basis) wherein the reinforcement agent consists of from 1% to 79% by weight cured green polysaccharide and from 0.1% to 79% by weight microfibrillated or nanofibrillated cellulose (starch plus polysaccharide plus MFC or NFC basis).

The enhanced starch resin composition of the present invention can be used to produce a number of different products and can be used in a number of different applications. Such products and applications are well understood by those of ordinary skill in the art. In some embodiments, the enhanced starch resin composition is in the form of a nanocomposite. In other embodiments, the enhanced starch resin composition is in the form of an adhesive, a film, a protective coating for paper, food packaging, resin for impregnation for fabrics, hard casts for fractured bones, or the like. In various embodiments, the enhanced starch resin of the present invention can be used in applications such as protective coating for paper, food packaging, resin for impregnation for fabrics and other forms of fibers (nonwovens, knitted fabrics, etc.) for making into composites by hot pressing or by other methods. Starch-based nanocomposites made with the enhanced starch resin composition of the present invention may also find applications in tissue and biomedical engineering (e.g., hard casts for fractured bones, etc.).

Process for Manufacture of Enhanced Starch Resins

In another aspect, the present invention relates to a method of making an enhanced starch resin composition. This method involves the following steps: providing a gelatinized starch mixture comprising gelatinized native and/or waxy starch; precuring the gelatinized starch mixture with a sufficient amount of a multi-functional polycarboxylic acid in the presence of a sufficient amount of a non-toxic, water-soluble catalyst effective to catalyze esterification of the native starch and/or the waxy starch with the multi-functional polycarboxylic acid, thereby yielding a precured starch mixture; and curing the precured starch mixture at a sufficient temperature for a sufficient period of time to yield a crosslinked starch resin composition comprising the native starch and/or the waxy starch crosslinked with the multi-functional polycarboxylic acid, wherein said crosslinked starch resin composition has at least one enhanced mechanical property and/or reduced absorption as compared to the native starch and/or the waxy starch.

The step of providing a gelatinized starch mixture involves gelatinizing a native starch and/or a waxy starch. In general, this can be achieved by adding the starch to water and then heating it at a sufficient temperature and for a sufficient amount of time to cause the starch to gelatinize Techniques and protocols for gelatinizing the native starch and/or waxy starch are described herein. In one embodiment, the starch mixture can be gelatinized at 90° C. in the presence of water. The viscosity depends on the solids content of starch in water (density can be increased by reducing water content and vice versa). Complete gelatinization may be desired for obtaining superior tensile properties. Partially gelatinized or intact starch granules present in the resin can serve as defects and reduce the properties of the resulting film made from the enhanced starch resin composition. As provided herein, after providing a gelatinized starch mixture of the present invention, the gelatinized starch mixture is then precured.

As set forth herein, in accordance with the method of the present invention, the gelatinized starch mixture that is provided undergoes a precuring step that involves precuring the gelatinized starch mixture with a sufficient amount of a multi-functional polycarboxylic acid in the presence of a sufficient amount of a non-toxic, water-soluble catalyst effective to catalyze esterification of the native starch and/or the waxy starch with the multi-functional polycarboxylic acid, thereby yielding a precured starch mixture. Techniques and protocols for precuring gelatinized starch mixture of native starch and/or waxy starch are described herein. As provided herein, after precuring the gelatinized starch mixture, the precured starch mixture is then cured.

As set forth herein, in accordance with the method of the present invention, the precured starch mixture undergoes a curing step that involves curing the precured starch mixture at a sufficient temperature for a sufficient period of time to yield a crosslinked starch resin composition comprising the native starch and/or the waxy starch crosslinked with the multi-functional polycarboxylic acid. This curing step yields a crosslinked starch resin composition that has at least one enhanced mechanical property and/or reduced absorption as compared to the native starch and/or the waxy starch. In certain embodiments, optimum pressure can be used to make a smooth and defect-free film. In specific embodiments, optimum pressure can be about 1 MPa, but it can also be higher. In other embodiments, carrying out the esterification reaction in the absence of water (e.g., curing after completely drying the films) may be desired and implemented for the esterification reaction since esterification is reversible in the presence of water and catalyst. In one embodiment of the method, the sufficient temperature to cure the precured starch mixture to yield the crosslinked starch resin composition comprises between about 100° C. and about 160° C.

In another embodiment of the method, the curing step is performed at a sufficient pressure to yield a crosslinked starch resin composition that is in a form of a smooth and substantially defect-free crosslinked starch film composition. In a particular embodiment, the sufficient pressure is from about 0.25 MPa and about 10 MPa, and more particularly from about 0.25 MPa and about 5 MPa. In other embodiments, the pressure can be higher for higher viscosities.

In another embodiment of the method, the sufficient time to form the crosslinked starch resin composition is a minimum of about 5 minutes and a maximum of about 120 minutes.

In some embodiments, the method further comprises drying the precured starch mixture prior to performing the curing step.

In another embodiment, this method further comprises, after curing the precured starch mixture, washing the cured crosslinked starch resin composition with a sufficient amount of water for a sufficient amount of time to remove or substantially remove any non-reacted multi-functional polycarboxylic acid and non-toxic, water-soluble catalyst. In various embodiments of this method, this step may be employed since unreacted crosslinker and catalyst may absorb moisture and act as a plasticizer. In other words, the remaining carboxylic acids and catalyst could decrease the tensile properties (e.g., Young's modulus) of starch-based materials in an uncontrolled manner.

In some embodiments of the method, the native starch and/or waxy starch is provided in an amount ranging from about 50 percent (%) and about 100% by weight. The native starch and/or waxy starch can be from any plant source that contains starch. In particular embodiments, the plant source for the native and/or waxy starch is a cereal, a tuber, or combinations thereof. Suitable examples of cereal plant sources for the native and/or waxy starch include, without limitation, maize, rice, wheat, sorghum, and combinations thereof. Suitable examples of tuber plant sources for the native and/or waxy starch include, without limitation, potato, sweet potato, tapioca, yam, cassava, and combinations thereof.

In one embodiment of the method, the multi-functional polycarboxylic acid is provided in an amount ranging from about 5% and about 25% by weight. Suitable multi-functional polycarboxylic acids for use in this method are as described above and herein. For polycarboxylic acids mentioned above and herein that are not water-soluble, dimethyl sulfoxide (DMSO), which is another non-toxic solvent, may be used instead of water. The processing conditions remain exactly the same as with water. However, the drying time may adjusted (e.g., longer drying time) since DMSO is more viscous than water and non-volatile.

In one embodiment of the method, the non-toxic, water-soluble catalyst is added to catalyze the esterification reaction in an amount ranging from about 10% and about 50% based on the dry weight of the multi-functional polycarboxylic acid. Suitable non-toxic, water-soluble catalysts for use in this method are as described above and herein.

In yet another embodiment, this method further comprises mixing an additive with the gelatinized starch mixture prior to performing the precuring, wherein the additive is selected from the group consisting of a plasticizer, a reinforcement agent, and combinations thereof. Suitable plasticizers for use in this method are as described above and herein. Suitable reinforcement agents for use in this method are as described above and herein.

As set forth above and herein, this method is effective to produce an enhanced starch resin composition of the present invention having at least one enhanced mechanical property and/or reduced moisture absorption as compared to the native starch and/or the waxy starch. As discussed above, the enhanced starch resin composition of the present invention includes, without limitation, at least one enhanced mechanical property selected from the group consisting of increased Young's modulus, increased toughness, and increased fracture stress.

Also as set forth above and herein, this method is effective to produce an enhanced starch resin composition of the present invention that can be used to produce a number of different products. In some embodiments, the enhanced starch resin composition is in the form of a nanocomposite. In other embodiments, the enhanced starch resin composition is in the form of an adhesive, a film, a protective coating for paper, food packaging, resin for impregnation for fabrics, hard casts for fractured bones, or the like.

In one aspect, the present invention provides an enhanced starch resin composition produced according to the method of the present invention.

EXAMPLES

The following examples are intended to illustrate particular embodiments of the present invention, but are by no means intended to limit the scope of the present invention.

Example 1

'Green' Crosslinking of Native Starches with Malonic Acid and their Properties

Starch is a highly hydrophilic biomaterial with weak mechanical properties rendering it useless for commercial applications. A fully 'green' water based process is presented to crosslink corn (cereal) and potato (tuber) starch to enhance mechanical properties as well as lower hydrophilicity. In addition, malonic acid, a green, plant based water soluble and relatively inexpensive polycarboxylic acid, was used as the crosslinker. The reactivity of potato starch towards esterification and crosslinking was found to be higher than that of corn starch owing to the inherent differences in the granule morphology and internal structure of the two starches. It was observed that potato starch granules had a higher degree of substitution (DS) of 0.19 than corn starch granules (DS=0.1) under similar reaction conditions. Chemical, thermal and mechanical test results confirmed the crosslinking as well as reduced moisture sensitivity.

Experimental Procedure

Materials

Native CS (73% amylopectin and 27% amylose) and PS (76% amylopectin and 24% amylose) powders were obtained from Sigma Aldrich (Saint Louis, Mo.). Analytical grade MA and sodium hypophosphite monohydrate (Nahyp) were also purchased from Sigma Aldrich.

Preparation of Precured and Cured Starch Films

To process CS and PS into a crosslinked resin, starch was at first gelatinized by adding 20 g starch to 500 ml water and heating at 90° C. for 45 minutes with constant stirring. Theoretical calculations based on stoichiometry showed that ≈31.5% MA is required for complete crosslinking of starch with MA. For the precuring of starch resins 3, 5, 7.5 and 10 g MA (or 15%, 25%, 37.5% and 50% MA based on the initial dry weight of starch) were added, separately, to the gelatinized starch followed by addition of sodium hypophosphite (50% by weight of MA) as catalyst. Nahyp is proven to accelerate the process of esterification with polycarboxylic acids by increasing the speed of the formation of the cyclic anhydride intermediate (Sauperl & Stana-Kleinschek, 2010; Yang, 2001).

The mixture was stirred continuously for 60 min at 90° C. with a magnetic stirrer. After cooling the precured starch was cast to form thin films of approximately 0.3 mm thickness on a Teflon® coated glass plate and dried in an oven for 48 hours at 40° C. The dried films were peeled off from the Teflon® coated plates and stored in sealed polythene packets. The precured PS and CS films were further heated in Carver Hydraulic hot press (model 3891-4PROA00) for complete crosslinking (curing) at 120° C. under 0.1 MPa pressure for 20 min. Precured PS films (precured with 37.5% MA at 90° C. for 60 min) were also cured at 100° C. and 140° C. at 0.1 MPa pressure for 20 min to understand the effect of temperature on crosslinking. The cured CS and PS films were then thoroughly washed in water to remove excess MA and Nahyp. The starch films were completely soaked in DI water for 8-10 hours, the water was changed a couple of times, and it was expected that the unreacted MA and Nahyp molecules which were highly soluble in water leached out into the water (also confirmed by FTIR of the washed water containing traces of MA). The washed films were either air-dried in an oven at 70° C. for 2 days or conditioned at 21° C. and 65% relative humidity for 4.5 days for further characterization.

Determination of Degree of Substitution (DS)

The DS of precured PS and CS films (as a function of concentration of MA) and cured PS films (as a function of temperature) were calculated using the titration method (Mathew & Abraham, 2008). Precured or cured starch specimens, 0.5 g, were accurately weighed into a 100 ml vial and 50 ml deionized (DI) water was added. The sealed vial with water and starch was agitated in a shaker bath at 200 rpm for 4.5 days. The excess unreacted MA that leached out into the water was carefully neutralized with standard sodium hydroxide solution using phenolphthalein indicator. Excess standard NaOH (1 N, 10 ml) was added and shaken on a shaker bath for 1 hr at 200 rpm to achieve homogeneous mixing. The entire set up was stored at 50° C. for 3 days with occasional shaking for complete hydrolysis. At the end of 3 days the excess alkali was back-titrated with standard HCl (0.4 M) solution. A blank (control) was simultaneously titrated with native starch instead of precured or cured starch. Degree of substitution was calculated using following formulae (Mathew & Abraham, 2007).

% malonate =

$$\frac{([ml(blank) - ml(sample)]) \times normality\ of\ acid \times 0.104 \times 100}{sample\ weight\ in\ grams(dry\ basis)}$$

$$degree\ of\ substitution(DS) = \frac{162 \times \%\ malonate}{104 \times 1000 - (103 \times \%\ malonate)}$$

Attenuated Total Reflectance-Fourier Transform Infrared (ATR-FTIR) Spectroscopy

ATR-FTIR spectra were collected using a Nicolet Magna 560 FTIR spectrometer with a split pea accessory for ATR. Each scan was an average of 150 scans recorded from 4000 $cm^{-1}$ to 550 $cm^{-1}$ wavenumbers obtained at a resolution of 4 $cm^{-1}$. The spectra of pure starches, pure MA and precured and cured starches were obtained and compared.

In order to construct a calibration curve from the ATR-FTIR spectra, the absorption peak at 1725 $cm^{-1}$ due to the ester carbonyl (C=O) stretching vibrations was chosen as the analyte peak. It monitored the concentration of ester, which is related to the concentration of MA in the specimen. Since the absorption due to aliphatic —C—H stretching vibration, at 2929 $cm^{-1}$, remains unchanged after the crosslinking reactions, it was chosen as the reference peak for the internal standard. The ratio of absorbance by the analyte peak and the reference peak was plotted against concentration of MA. This method was similar to the calibration method used by Coma et al. (Coma, Sebti, Pardon, Pichavant & Deschamps, 2003), to assess the degree of crosslinking of cellulose with citric acid.

Thermogravimetric Analysis (TGA)

Native and crosslinked starch specimens (both PS and CS) were scanned from 25° C. to 600° C. using a thermogravimetric analyzer (TGA-2050, TA Instruments, Inc., New Castle, Del.) at a rate of 10° C./min in nitrogen atmosphere to characterize their thermal stability and degradation behavior. Malonic acid was scanned from 25° C. to 400° C. at 10° C./min.

Differential Scanning Calorimetry (DSC)

In order to test the specimen in DSC the precured and cured specimen were conditioned for 3 days at 21° C. and 65% relative humidity. Specimens weighing about 12 mg (MA, native PS as well as precured and cured PS) were accurately weighed and scanned on the DSC (model-2920, TA Instruments, Inc., New Castle, Del.) from 25° C. to 400° C. at a ramp rate of 25° C./min to obtain thermograms (Reddy & Yang, 2010). The DSC was calibrated using ASTM 968-99 and E967-97 procedures. The melting, decomposition and crystallization temperatures were obtained using ASTM 794-98 procedure.

Wide Angle X-ray Diffraction Study (WXRD)

Scintag θ-θ powder wide angle diffractometer (PADX, Scintag, Inc., Cupertino, Calif.) with a solid-state intrinsic germanium detector was used at 40 kV and 40 mA to study the X-ray diffraction (WXRD) patterns in MA, native and crosslinked (cured) PS and CS specimens. The specimens were scanned from 5° C. to 40° C. at the speed of 1° C./min using the Cu Kα X-ray radiation (1.5405 Å) at 45 kV and 40 mA. The crosslinked resin specimens were used in the form of films (Imberty & Perez, 1988).

Swelling Power and Gel Fraction of Films

The swelling power of crosslinked PS (cured at 120° C. and 0.1 MPa for 20 mins) films with 15%, 25% and 37.5% initial concentration of MA, were determined according to the method given by Yun and Yoon (Yun, Wee, Byun & Yoon, 2008). Accurately weighed dry crosslinked (cured) PS films (0.5 g) were immersed in distilled water at room temperature (25° C.) for 3 days. At the end of soaking period the films were taken out, the moisture on the surface was removed and the weight of the films was measured.

The swelling power was calculated as follows:

$$Swelling\ power = \frac{W_e - W_o}{W_o}$$

where $W_o$ is the dry weight of the starch films and $W_e$ is the weight of the film after being immersed in water for 3 days.

The swelling power of starch in DMSO was found by using the modification of a method demonstrated by Zhou et.

al (Zhou, Zhang, Ma & Tong, 2008). The crosslinked starch films were conditioned in 21° C. and 65% relative humidity for 2 days prior to soaking in 20 mL DMSO at room temperature for 24 hr. The films were accurately weighed ($m_d$) before immersing in DMSO. The swollen films were filtered, washed with water and ethanol, wiped lightly and weighed ($m_s$).

The swelling power was calculated as follows:

$$\text{swelling power} = \frac{m_s - m_d}{m_d}$$

To calculate the gel fraction the insoluble part of the film was washed thoroughly with water and ethanol and vacuum dried at 80° C. The films were conditioned at 21° C. at 65% relative humidity and weighed ($m_g$)

The gel fraction was calculated as follows:

$$\text{Gel Fraction} = \frac{m_g}{m_d} \times 100\%$$

Mechanical Properties

The resin films were cut into rectangular pieces of 50 mm×10 mm dimensions to test their tensile properties. The film thickness was approximately 0.30 mm. The films were thoroughly washed with water, conditioned for 4.5 days at 65% relative humidity and at a temperature of 21° C. prior to testing. The tensile properties of gelatinized and crosslinked films were characterized using Instron, model 5566 (Instron Co., Canton, Mass.), according to ASTM D882-02. A gauge length of 30 mm and a strain rate of 0.6 were used for all specimens. At least 5 specimens were tested to obtain the average values.

Results and Discussion

Infrared Spectroscopy

Figure 3A:
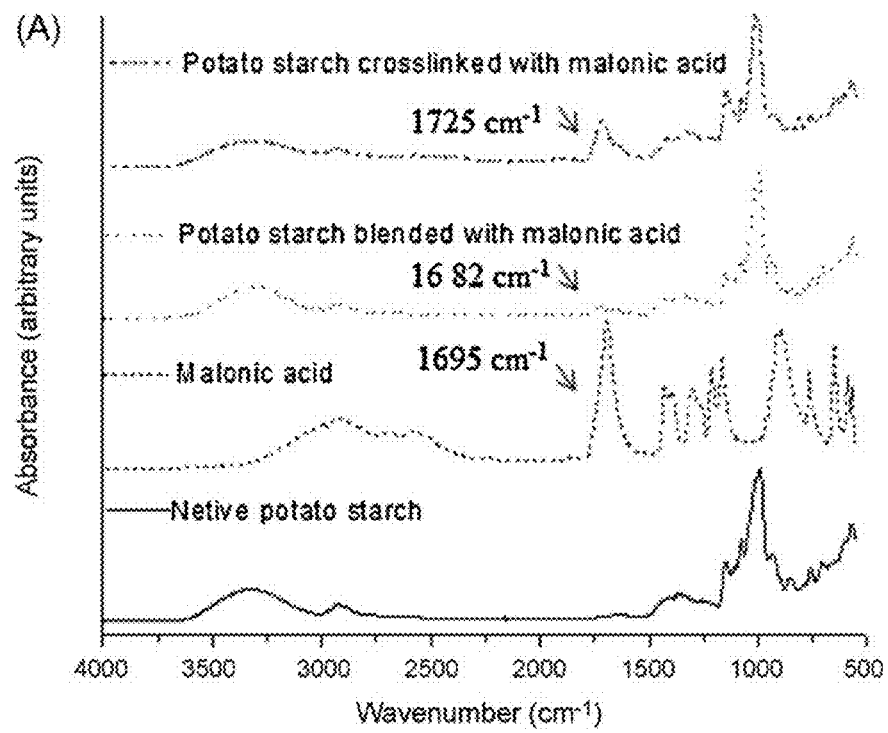
FIGS. 3A-3B are graphs showing the ATR-FTIR spectra of gelatinized PS, MA, blend of native PS and MA and PS crosslinked (cured at 120° C. at 2000 lb for 20 min) with 37.5% MA (FIG. 3A) and the extent of esterification of PS and CS as a function of initial MA content, using the internal calibration curve (FIG. 3B).

The ATR-FTIR spectra of gelatinized PS, MA, blend of native PS and MA and PS crosslinked (cured at 120° C. at 2000 lb for 20 min) with 37.5% MA are presented in FIG. 3A. From the ATR-FTIR spectra it can be observed that gelatinized starch has three C=O stretching absorption peaks (C—O—C and C—O—H) between 923 and 1162 $cm^{-1}$, the fingerprint region (Fang, Fowler, Tomkinson & Hill, 2002). The peaks at 1083 and 1023 $cm^{-1}$ are attributed to the glucopyranose ring O—C stretching vibrations. The peak at 1640 $cm^{-1}$ is assigned to the water adsorbed by starch molecules. The hydrogen bonded hydroxyl group appears as a very broad peak at 3403 $cm^{-1}$ while the aliphatic C—H stretch is observed as a sharp peak at 2629 $cm^{-1}$ (Fang, Fowler, Tomkinson & Hill, 2002). ATR-FTIR spectrum of MA shows a sharp peak at 1695 $cm^{-1}$ for the carbonyl stretching. The broad peak at 2890 $cm^{-1}$ is attributed to the stretching of hydrogen bonded hydroxyl groups. Hydroxyl, O—H, deformations and C—O stretching modes show peaks at 1433 $cm^{-1}$ and 1293 $cm^{-1}$, respectively. On comparing the spectra of gelatinized PS, MA and PS esterified with MA shown in FIG. 3A, the presence of ester bond can be confirmed by the presence of carbonyl (C=O) peak in cured (crosslinked) PS that is observed at 1725 $cm^{-1}$. A similar peak at 1725 $cm^{-1}$ was also observed for CS esterified with MA. The ATR-FTIR spectra obtained for CS and PS esterified with MA were identical and hence the spectrum for CS is not presented. It was further noted that the carbonyl stretching peak for MA appeared at 1695 $cm^{-1}$ and that for the mixture of PS and MA appeared at 1682 $cm^{-1}$. These results are similar to those observed by Sauperl and Stana-Kleinschek (Sauperl & Stana-Kleinschek, 2010) in which the carbonyl peak for unreacted 1, 2, 3, 4-butanetetracarboxylic acid appeared at 1701 $cm^{-1}$ and shifted to 1725 $cm^{-1}$ after ester formation (Sauperl & Stana-Kleinschek, 2010; Yang, Lu & Lickfield, 2002). Mathew and Abraham (Mathew & Abraham, 2007) reported the esterification of native PS with ferulic acid which showed the presence of carbonyl peak in the FTIR spectrum at around 1726 $cm^{-1}$ which was distinct from the carbonyl peak obtained for ferulic acid at 1692 $cm^{-1}$.

Figure 3B:
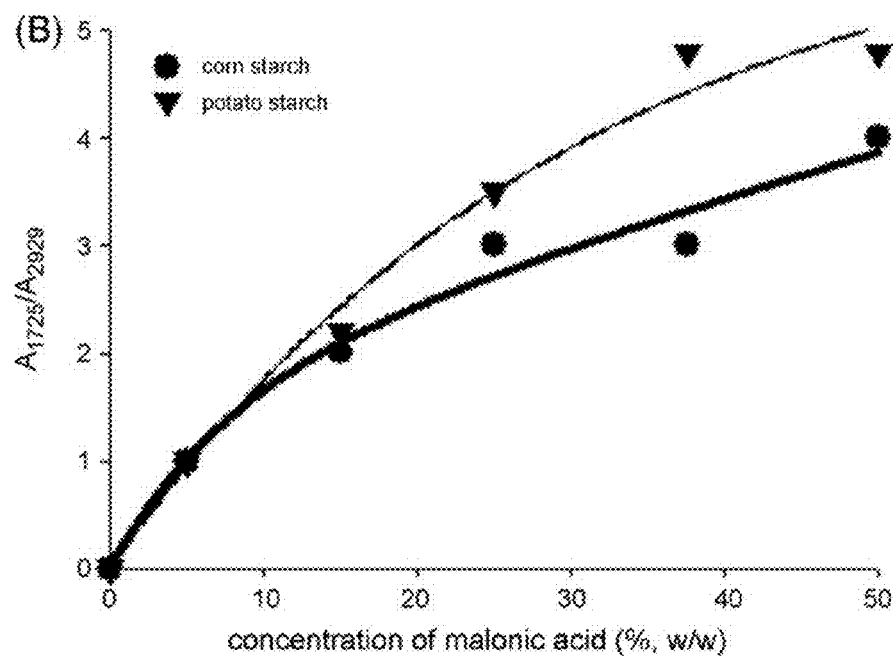

FIG. 3B shows the extent of esterification of PS and CS as a function of initial MA content, using the internal calibration curve. A gradual increase in the $A_{1725}/A_{2929}$ ratio was observed as the concentration of MA increased which leveled off as the concentration of MA reached 50%. This implies that with the increase in MA concentration there was an increase in the number of ester bonds formed (Coma, Sebti, Pardon, Pichavant & Deschamps, 2003). The absorbance of the standard peak ($A_{2929}$) did not vary with crosslinking. The absorbance at 1725 $cm^{-1}$ becomes saturated at a higher concentration of MA (50%) which may indicate a possible saturation in terms of crosslinking percentage or saturation of the infrared signals (Coma, Sebti, Pardon, Pichavant & Deschamps, 2003). On comparing the internal calibration curves for precured PS and CS it was evident that at any concentration of MA, PS had a higher extent of esterification. This can be related to the more flexible granular microstructure of PS. This observation was also confirmed by the DS values of precured PS and CS determined by titration method as discussed later. It was also found that the ester carbonyl peak absorbance increased with the decrease in pH the highest being at pH of 1.5.

Degree of Substitution by Titration

Figure 4A:
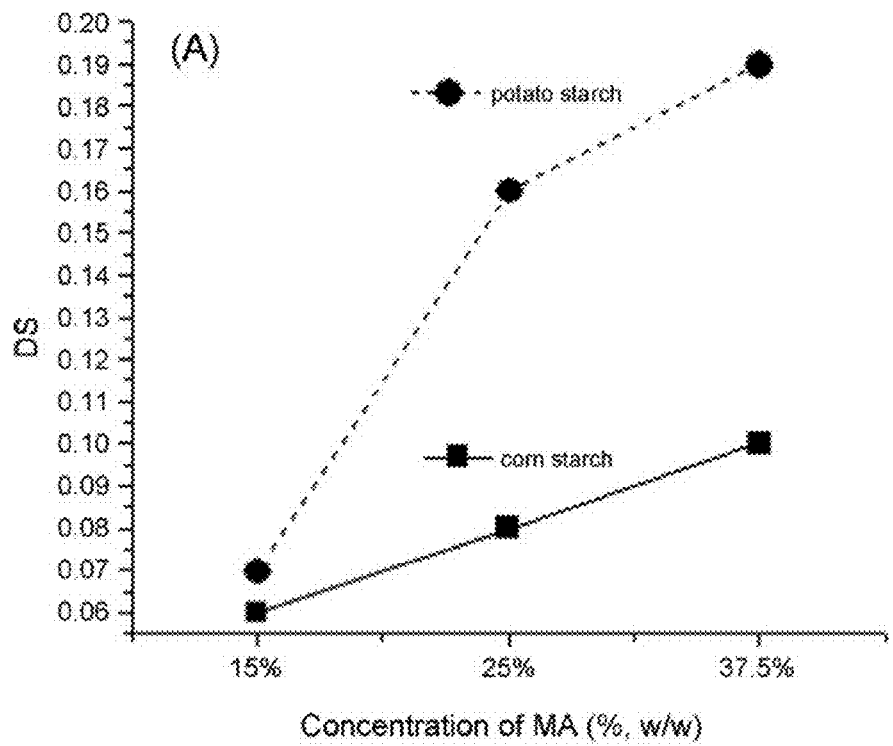
FIGS. 4A-4B are graphs showing the DS of precured PS and CS as a function of MA concentration (FIG. 4A) and PS (precured with 37.5% MA at 90° C. for 60 min) as a function of curing temperature (FIG. 4B).
Figure 4B:
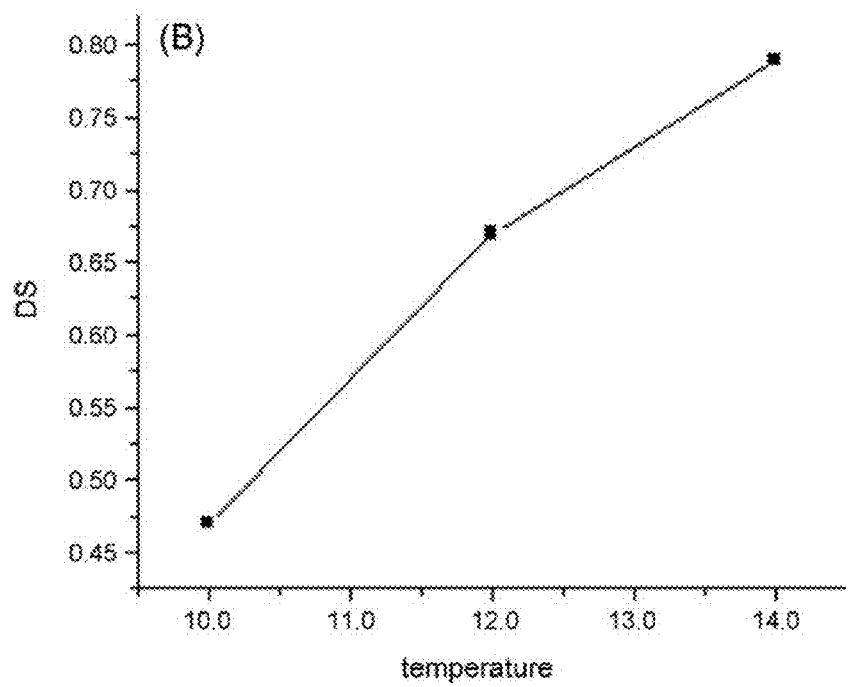

The DS of a starch derivative is defined as the number of hydroxyl groups substituted per D-glucopyranosyl ring (Mathew & Abraham, 2007). Since each ring possesses three hydroxyl groups, the maximum DS possible is 3. However, the primary hydroxyl group (C-6) is much more reactive than the two secondary hydroxyl groups (C-2 and C-3) due to steric hindrance (Mathew & Abraham, 2007). DS is affected by various factors like source of starch, amylose and amylopectin content, reactant concentration, reaction time and temperature (Mathew & Abraham, 2007; Xu, Miladinov & Hanna, 2004; Zhu, Zhang & Lai, 2007). FIG. 4A shows DS of precured PS and CS as a function of MA concentration while FIG. 4B shows the DS of PS (precured with 37.5% MA at 90° C. for 60 min) as a function of curing temperature. The DS values were calculated by the titration method. It is clear that the DS values increased with increase in the MA concentration (FIG. 4A). This is because high MA concentration results in greater availability of MA in the vicinity of the OH groups on the starch molecules (Xu, Miladinov & Hanna, 2004). The DS values were 0.07, 0.16 and 0.19 for PS precured with 15%, 25% and 37.5% MA for 60 min, respectively; the corresponding DS values for CS were 0.06, 0.08 and 0.1 (FIG. 4A). Since the internal calibration curve in FIG. 3B already showed that crosslinking reached a saturation at higher concentrations of MA, DS was not calculated for MA concentrations above 37.5%. The data in FIG. 4A indicate that the DS for CS at any concentration was lower than that of PS. This is expected since PS has been shown to be more reactive than CS (Singh, Chawla & Singh, 2004). This is further attributed to the more compact structure and presence of lipids in CS granules. Lipids form complex with the amylose and leads to the formation of a rigid structure which inhibits penetration of external reactants and prevents substitution. PS on the other hand has a more flexible structure and the hydroxyl groups are more exposed for reaction (Mishra & Rai, 2006; Singh, Chawla & Singh, 2004). The DS values obtained by the titration method (FIG. 4A) confirm the earlier discussed results of the extent of esterification reaction obtained by the internal calibration curves (FIG. 3B) that higher esterification is obtained with increase in the concentration of MA. This trend is consistent with the results of crosslinking cellulose with a polycarboxylic acid like citric acid reported by Coma et al. (Coma, Sebti, Pardon, Pichavant & Deschamps, 2003). As mentioned earlier, the DS values obtained for PS were higher than those of CS at any concentration of MA. Since the DS of the precured PS specimen, with 37.5% MA, was the highest, this specimen was chosen for curing in a hot press. The DS of cured specimens were significantly higher than DS of precured specimens as could be expected. DS values for the crosslinked PS specimens (with 37.5% MA) cured at 100, 120 and 140° C. were found to be 0.47, 0.67 and 0.79, respectively, as shown in FIG. 4B. It was also observed that films of PS precured with 37.5% MA for 60 min, showed a significant reduction in the ester carbonyl peak absorbance in ATR-FTIR after soaking in deionized water (pH=7) for 2 days and drying thereafter. This was possibly due to hydrolysis of the ester bond in presence of water as well as washing away of unreacted malonic acid. However in the case of PS specimens precured with 37.5% MA for 60 min followed by curing for 120 min at 0.1 MPa and 20 min, the ester carbonyl peak was much more stable and soaking in water for 1 day to 4 days did not produce any significant reduction in the ATR-FTIR absorbance of the ester carbonyl peak. From these experiments it was concluded that after curing, the number of ester bonds formed was significantly higher and the number of ester bonds hydrolyzed, after soaking in water, was negligible compared to the total number of ester bonds formed. This confirms that high temperature (120° C.) curing increases the extent of esterification. Also, there was much less unreacted MA in the system after curing which is indicative of higher crosslinking that leads to higher ester peak intensity both before and after the soaking in DI water (pH=7). These results combined with the increase in DS values with increase in curing temperature led us to conclude that the DS of starch specimens increased with increase in curing temperature due to higher extent of esterification at higher temperature. While in the hot press MA and starch also react at a higher temperature in the absence of water that leads to higher esterification and crosslinking than precuring the specimens in aqueous conditions. Carrying out esterification reaction in the presence of minimum water is crucial due to reversibility and hydrolysis of the esterification reaction, as explained earlier. The DS of the starch ester prepared with malonic acid in aqueous conditions were higher than the DS values reported (maximum DS of 0.02) for starch (waxy maize and amaranth) ester formation in aqueous conditions with n-octenyl succinic anhydride (Bhosale & Singhal, 2006).

Wide Angle X-Ray Diffraction (WXRD) Studies

Figure 5:
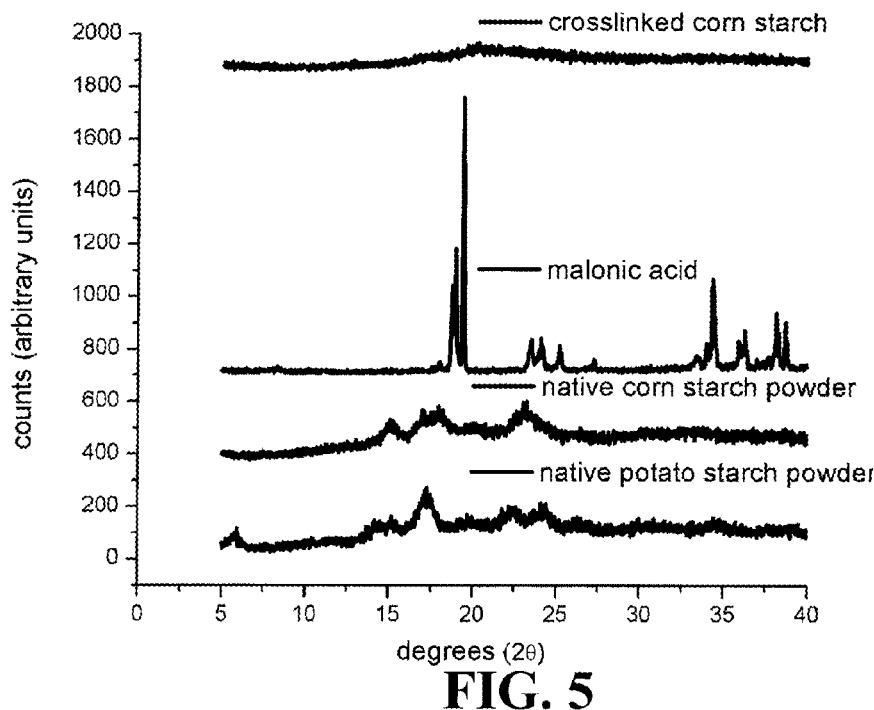
FIG. 5 is a graph showing WXRD patterns of native PS and CS powders, MA and gelatinized and crosslinked CS.

FIG. 5 shows WXRD patterns for native PS and CS powders, MA and gelatinized and crosslinked CS. Native CS shows A-type crystal structure typical for cereal starches whereas native PS shows B-type crystal structure typical for root or tuber starch (Zobel, 1988). It was observed that native CS powder showed crystal peaks at 2θ of 15°, 17°, 18° and 23° and native PS powder showed crystal peaks at 2θ of 5.6°, 15°, 17° and 22° which is consistent with previously reported values (Zobel, 1988). The WXRD patterns for gelatinized and crosslinked PS were identical to those of crosslinked CS, and therefore, not shown. WXRD patterns in FIG. 5 indicate that the crystal structures of CS and PS as well as MA were completely destroyed after gelatinization and crosslinking. The destruction of crystallization due to gelatinization helped in exposing the hydroxyl groups of the starch molecules which ensured better reaction with MA molecules. In addition, the substitution of the hydroxyl groups on the starch molecules with the ester groups prohibited the inter- and intra-molecular hydrogen bonding, completely disrupting the crystal structures. This is in agreement with the DSC results which confirmed that the MA crosslinked starch showed no crystal melting endotherm and are discussed in details later. It is also expected that as the crosslinked molecules cannot reorganize in 3-D crystal structures this prevented the recrystallization of the starch molecules after crosslinking.

Swelling Power and Gel Fraction Studies

Figure 6A:
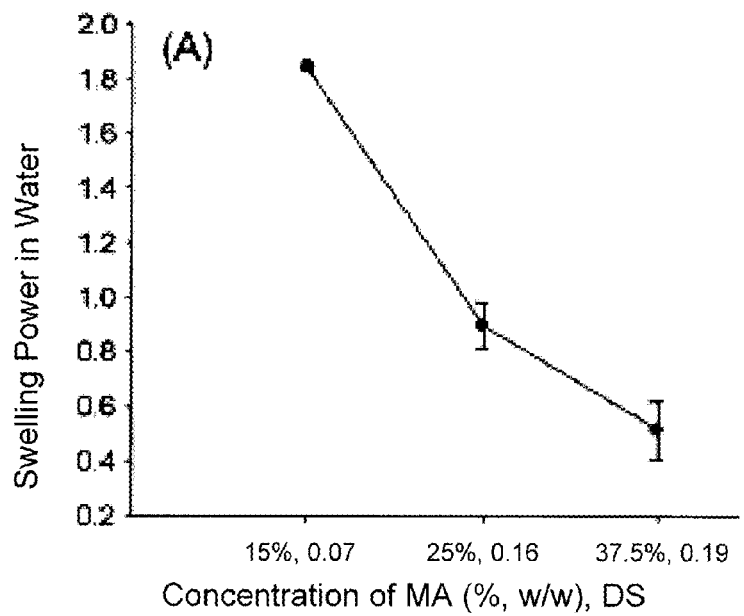
FIGS. 6A-6C are graphs showing the swelling power of crosslinked PS (cured at 120° C. and 0.1 MPa for 20 min) with 15%, 25% and 37.5% initital MA concentration, in water (FIG. 6A), the swelling power of crosslinked PS (cured at 120° C. and 0.1 MPa for 20 min) with 15%, 25% and 37.5% initital MA concentration, in DMSO (FIG. 6B), and the gel fraction of crosslinked PS (cured at 120° C. and 0.1 MPa for 20 min) with 15%, 25% and 37.5% initital MA concentration, DMSO (FIG. 6C).
Figure 6B:
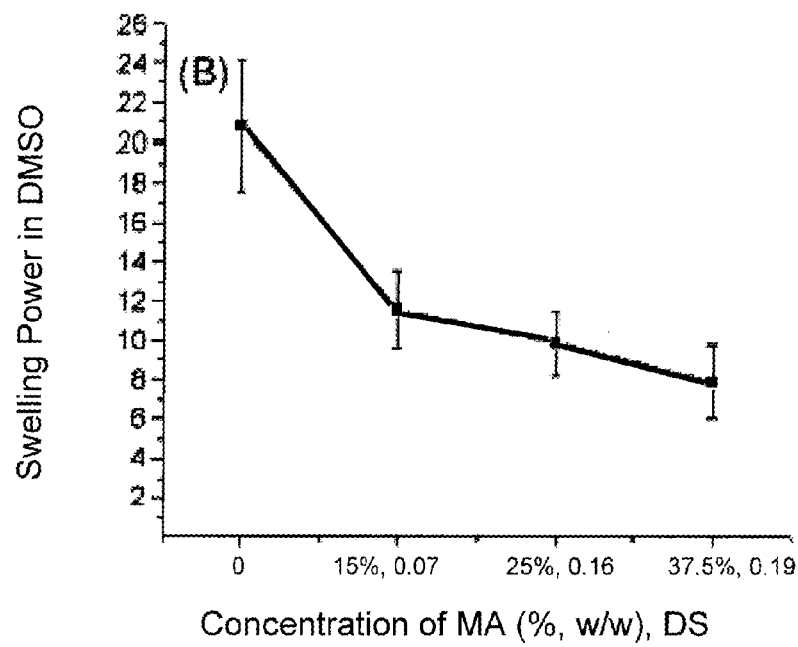
Figure 6C:
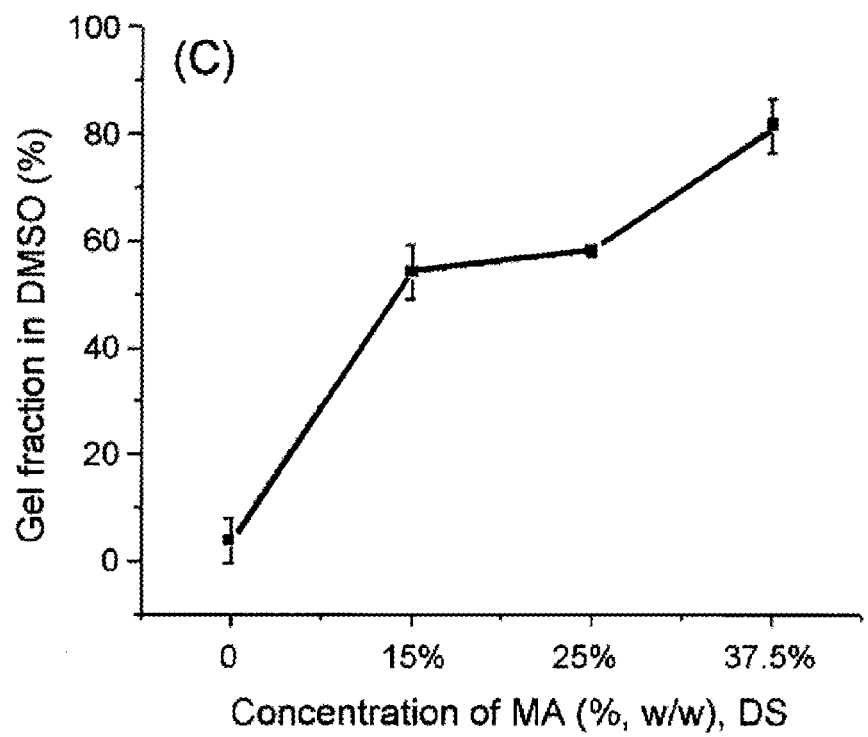

FIGS. 6A-6C show: FIG. 6A: the swelling power of crosslinked PS (cured at 120° C. and 0.1 MPa for 20 min) with 15%, 25% and 37.5% initial MA concentration, in water; FIG. 6B: the swelling power of crosslinked PS (cured at 120° C. and 0.1 MPa for 20 min) with 15%, 25% and 37.5% initital MA concentration, in DMSO; and FIG. 6C: the gel fraction of crosslinked PS (cured at 120° C. and 0.1 MPa for 20 min) with 15%, 25% and 37.5% initial MA concentration, in DMSO. The swelling power of starch depends on the nature of the polymer network like presence of hydrophilic groups, crosslink density, elasticity of polymer network, pH and the swelling medium and its temperature (Pang, Sun, Tay & Tchong, 2011).

The inherent property of starch to absorb a lot of moisture affects the mechanical properties of starch and any improvement in reducing the moisture sensitivity is important for industrial application of starch. It has been shown in FIG. 6A the swelling power decreases as the initial concentration of MA increases. As the concentration of MA initially used to crosslink starch increases, there is an increase in the degree of substitution as shown in FIG. 4A. The decrease in the swelling power with the increase in initial MA concentration was clearly due to the increase in the crosslinking density which hindered the penetration of water into the starch molecular network. The destruction of crystallization due to gelatinization helped in exposing the by droxyl groups of the starch molecules which ensured better reaction with MA molecules. This led to higher degree of substitution as well as crosslinking. The formation of a network structure with crosslinking prevents absorption of water.

The wet and swollen crosslinked (cured) PS specimens curled up and folded but remained intact in water and the water was completely transparent indicating that the specimens did not disintegrate. The gelatinized PS (without MA) specimen on the other hand disintegrated in water. Swelling powers of CS for different concentrations of MA were not calculated because of the difficulty in handling the swollen CS films which led to inconsistent values. The swelling power of 1.15 obtained for crosslinked (cured) CS with 37.5% MA after swelling for 3 days was, higher than that of PS (0.6), under similar conditions, because of the lower reactivity resulting in lower crosslinking density of the CS films. As explained earlier, crosslinking strengthens the polymer network reducing the absorption of water and does not allow it to swell.

FIGS. 6B and 6C show that the swelling power decrease and the gel fraction of starch films increase with increase in the initial concentration of MA used to crosslink the starch films. As shown earlier in FIG. 4A the DS of starch increases with increase in the initial MA concentration. The decrease in swelling power and increase in gel fraction was due to the increase in crosslinking or increase in the DS with increasing initial MA concentration. Gelatinized starch (without MA) is almost completely soluble in DMSO and the gel fraction increases with increase in crosslinking as expected.

DSC and TGA Studies

Figure 7A:
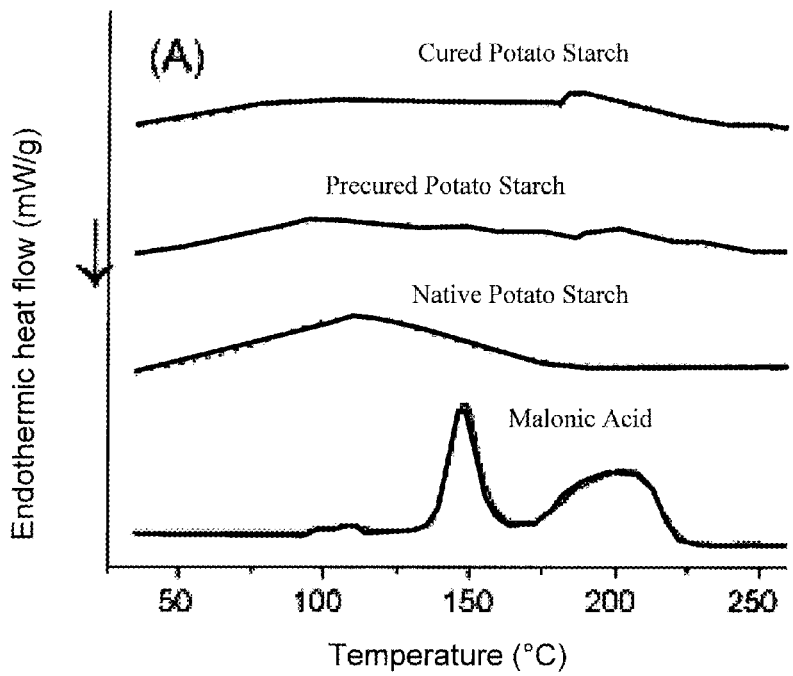
FIGS. 7A-7D are graphs showing DSC thermograms of MA and native, precured and cured PS heated from 25° C. to 260° C. at 25° C./min (FIG. 7A), DSC enthalpy values for moisture absorption for PS specimens precured with different MA concentrations (FIG. 7B), thermal degradation behavior of MA (FIG. 7C), and TGA of PS powder and cured PS (with 37.5% MA) (FIG. 7D).

DSC thermograms of MA and native, precured and cured PS specimens heated from 25° C. to 260° C. at 25° C./min are shown in FIG. 7A. A broad endothermic peak was observed for native, precured and cured PS specimens at 100° C. corresponding to the evaporation of the absorbed moisture. The DSC thermogram for native, precured and cured specimens indicated no glass transition or crystal melting peak before 260° C. (Zhang, Zhang, Huang, Yan, Zhang & Tang, 2010). After 260° C. the starch decomposes, as was indicated by TGA studies that are discussed later. After crosslinking, the remaining dispersed MA remains completely amorphous as indicated by the absence of crystal melting peak in the DSC thermograms and was confirmed by WXRD results discussed earlier.

Figure 7B:
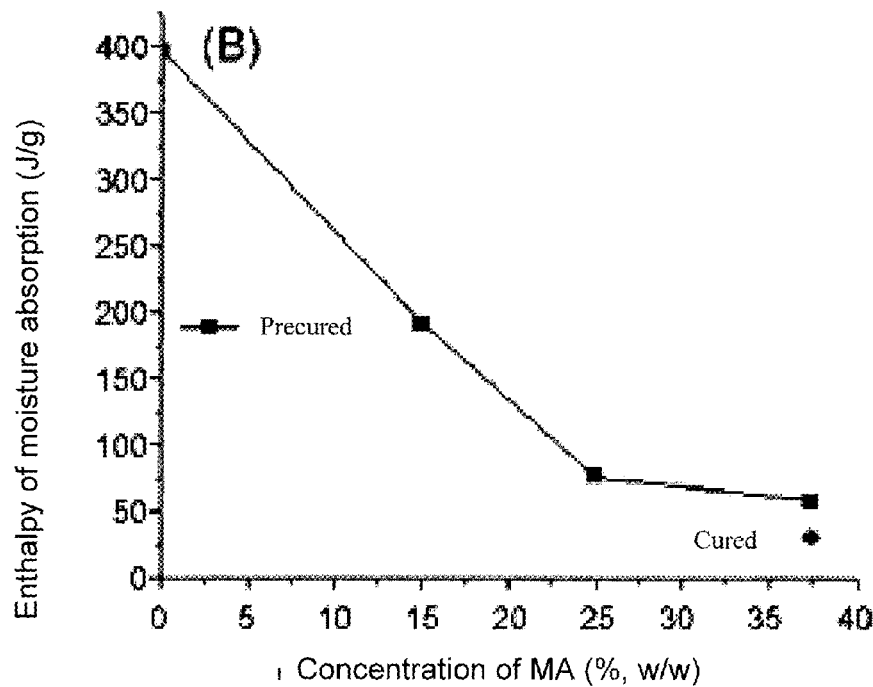

FIG. 7B indicates the DSC enthalpy values of moisture absorption for PS specimens precured with different MA concentrations. The data indicate that as the concentration of MA increased the enthalpy for moisture absorption of precured PS specimens decreased. This is expected since higher concentration of MA leads to higher crosslinking lowering the moisture content in the crosslinked starch. This trend is similar to the decrease in swelling power for PS with increase in concentration of MA, as explained before. The plot also shows that DSC enthalpy value for moisture absorption for cured PS specimen (with 37.5% MA) is lower than the precured specimen with the same initial concentration of MA due to higher extent of crosslinking with curing.

Figure 7C:
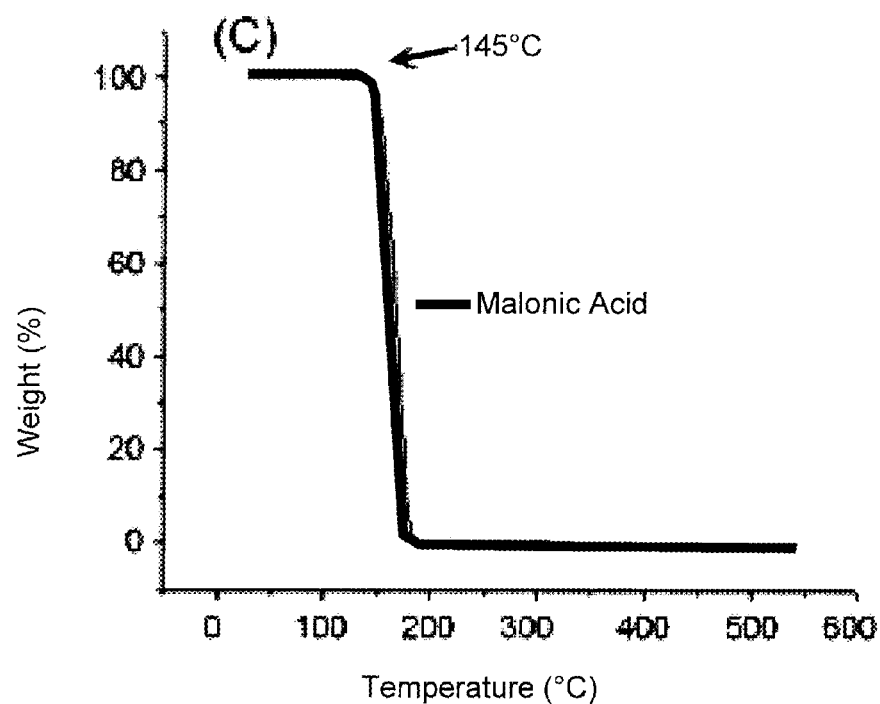
Figure 7D:
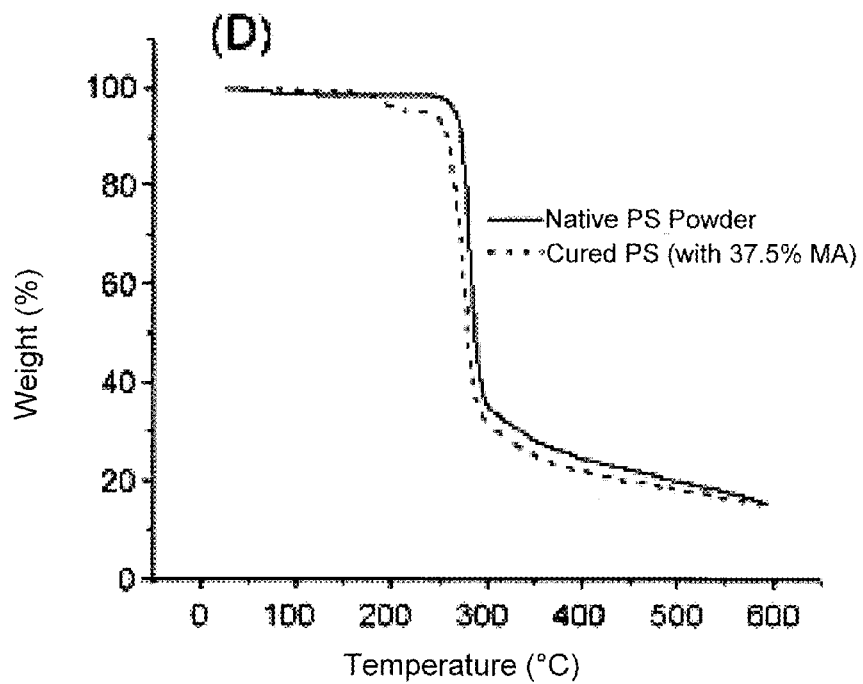

FIG. 7C shows the TGA thermogram of MA while FIG. 7D shows the thermogram of PS powder and cured PS (with 37.5% MA). These thermograms show that MA starts to degrade at 145° C. (FIG. 7C) while native PS and CS powder as well as gelatinized PS and CS powder start to degrade at 260° C. (FIG. 7D). It was observed that after crosslinking there was no change in the thermal properties of PS and CS. In the studies done by Zhang et al. (Zhang, Zhang, Huang, Yan, Zhang & Tang, 2010) it was observed that the initial thermal degradation temperature was 278° C. for gelatinized CS which decreased to 204° C. for starch oxalate ester (DS=0.87, obtained by titration). This was believed to be due the presence of half reacted carboxylic acid groups (starch oxalate half ester formation) which resulted in lower thermal stability of the starch resin. Since reaction of starch with malonic acid did not lead to lowering of the thermal degradation temperature it can be expected that both the carboxylic groups of MA reacted with starch to form a complete ester.

Tensile Properties

The tensile properties such as Young's modulus, tensile stress at maximum load and strain (%) at maximum load of gelatinized CS and PS, precured and cured PS films are summarized in Table 1.

TABLE 1

| Sample | Modulus (MPa) | Tensile stress at maximum load (MPa) | Tensile strain at maximum load (%) | Tensile strain at break (%) |
| --- | --- | --- | --- | --- |
| Gelatinized PS | 923 (12.54) | 33.45 (17.67) | 5.85 (32.5) | 7.6 (45.72) |
| Precured PS | 1359.8 (22.68) | 35.5 (2.14) | 4.68 (15.8) | 6.3 (17.76) |
| Cured PS | 2701 (18.79) | 23.17 (27.74) | 1.58 (34.48) | 2.08 (46.19) |

Figure 8A:
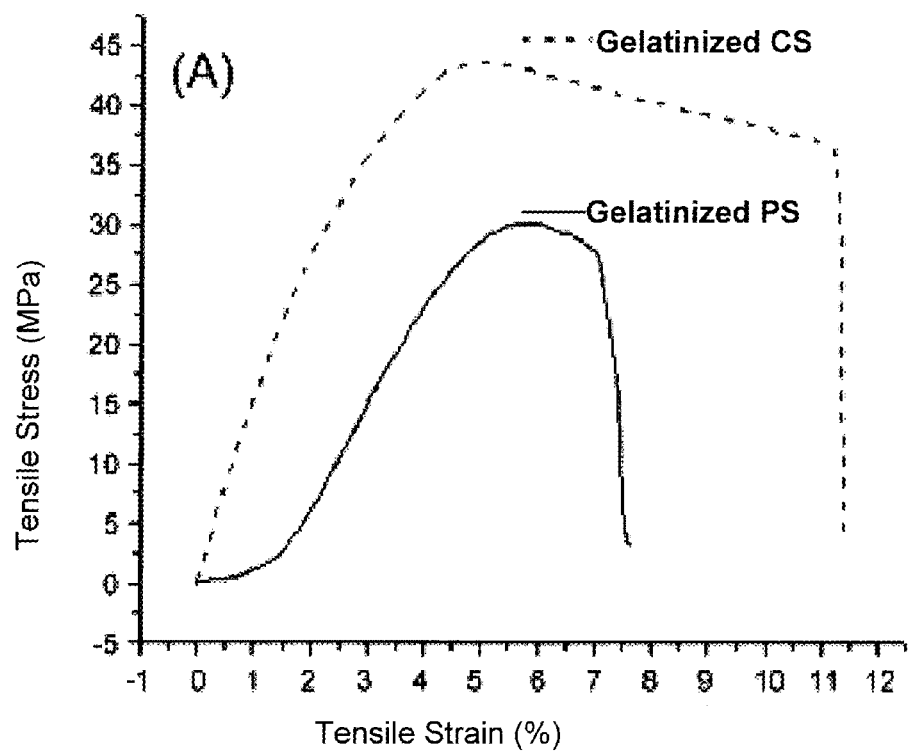
FIGS. 8A-8B are graphs showing tensile stress-strain curves of gelatinized CS and PS (FIG. 8A) and gelatinized, precured and cured PS (FIG. 8B).
Figure 8B:
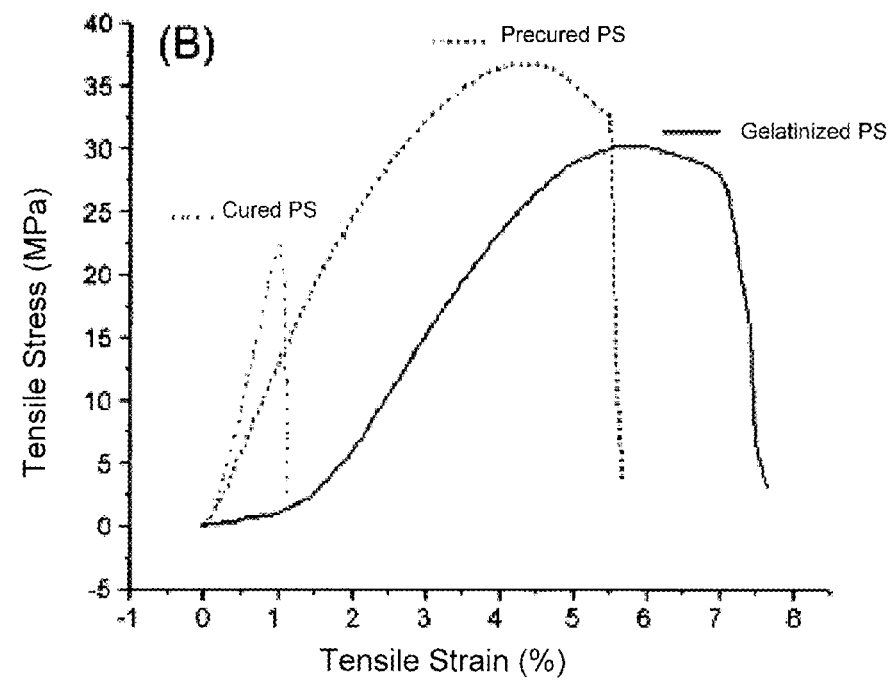

The tensile stress-strain curves for gelatinized PS (without MA) presented in FIGS. 8A-8B show classic yielding prior to fracturing.

The stress-strain curves of gelatinized, precured and cured PS are presented in FIG. 8B. The Young's modulus for gelatinized PS was 923 MPa. After precuring and curing the Young's modulus increased significantly to 1359.8 and 2701 MPa, respectively (FIG. 8B). This increase in modulus is attributed to higher crosslinking of the PS after curing as compared to precured starch and gelatinized starch. Crosslinking forms a rigid network structure and thus increases the Young's modulus. However, part of the increased Young's modulus is also due to the lower moisture absorption after crosslinking. The tensile stress at maximum load decreased from 35.5 MPa for precured PS and to 23.17 MPa for cured PS and strain at break (%) at maximum load decreased from 4.68% to 1.58% for precured and cured starches, respectively. The lower value of strain at break (%) at maximum load is attributed to the brittle nature of the cured PS compared to the precured PS and native PS both of which show yielding prior to fracture. The decrease in stress at maximum load for the cured PS is primarily due to its significantly lower fracture strain. It was also evident from Table 1 that there was a significant increase in strain at break as compared to the strain at maximum load for both gelatinized and precured starch indicating yielding. The strain at break (2.08%) in case of cured PS was not much higher than strain at maximum load (1.58%) indicating a brittle fracture; there was no yielding prior to fracture. The typical stress-strain curve for a highly crosslinked specimen as in the case of cured PS (FIG. 8B) in absence of a plasticizer show brittle fracture, the specimen attains the highest load and then fails catastrophically. This is attributed to the decrease in molecular mobility as a result of crosslinking and formation of a thermosetting polymer (Chabba & Netravali, 2005).

Conclusions

A completely green, easy to scale-up water based process was developed for crosslinking of starches using malonic acid, a plant based, non-toxic, sustainable crosslinker. Malonic acid esterification of corn starch and potato starch indicated that potato starch is more reactive compared to corn starch owing to the inherent structural differences in these two starches. The differences in reactivity in the starches was evident from the degree of substitution, calculated using a chemical titration method, which showed that PS has higher degree of substitution than CS. The same results were confirmed from the internal calibration curve plotted using the ATR-FTIR spectra. Curing was found to increase the degree of substitution and hence crosslinking. The extent of esterification and crosslinking also increased with increase in concentration of malonic acid. Crosslinking potato starch with malonic acid also made the starch films brittle but led to an increase in Young's modulus. The hydrophilicity of crosslinked potato starch also decreased as a result of crosslinking which may have contributed to the higher Young's modulus. These increases in Young's modulus and hydrophobicity are advantageous for industrial application of starch as films and resins for developing green composites.

Example 2

Crosslinked Waxy Maize Starch Based on 'Green' Composites

In this example, 'green' composites were fabricated by blending waxy maize starch (WMS) with micro/nano fibrillated cellulose (MFC). Further, an environment friendly, sustainable and water soluble crosslinker, 1,2,3,4-Butane Tetracarboxylic Acid (BTCA), was used to crosslink WMS to fabricate crosslinked starch based composites. The method described here provides a benign and convenient way to produce crosslinked starch based composite films ($\approx$300 µm in thickness), comparable to commercially available plastic sheets. The process can be easily scaled up for commercial production. Industrially pregelatinized WMS was used to obtain smooth, transparent and defect-free films. Crosslinking helped in reducing the moisture absorption as well as made the films and composites insoluble in water. MFC (15% MFC)-crosslinked WMS composite films exhibited excellent tensile properties with a Young's modulus of over 2.3 GPa, fracture strain of 3.1% and fracture stress of 39 MPa, as a result of MFC incorporation. The toughness of these composites was also significantly higher, even without the use of plasticizers such as sorbitol. These materials can be good candidates for replacing petroleum based resins such as epoxies and their composites.

To synergize the effect of starch and cellulose, in this research a convenient, easy to scale up and water based process for fabricating sustainable, environment friendly composite films was developed. Cellulose in the form of micro- and nano-fibrillated cellulose (MFC) was used as the reinforcing element. Blending starch and cellulose provided a synergistic effect resulting in much higher mechanical properties. Further, WMS was crosslinked using 1,2,3,4-Butane Tetracarboxylic Acid (BTCA), a nontoxic water based crosslinker, to prepare the resins. In this example, the primary focus was to obtain environment friendly resin films that had Young's modulus comparable to epoxy resins and composites but with higher toughness and higher water resistance compared to native starch. The starch based composite films were not only green and sustainable but the fabrication process developed was easy and water based that could be easily scaled up. While each film prepared in the example was approximately 18 cm×30 cm with a thickness of 0.003 cm, the process has the ability to produce larger quantities without compromising the properties, making it commercially viable.

WMS is a genetically modified maize starch with more than 99% amylopectin which aids in the formation of amorphous, smooth, homogeneous, transparent and defect-free films.[7] The study by Myllarinen et al.[7a] revealed that pure amylopectin film was generally amorphous. Regular native starches also involve substantial amount of time in gelatinization and precuring that result in semisolid viscous resin difficult to fabricate into homogeneous films.[4b] Commercially available pregelatinized and instantenized food grade WMS, used in this example, was crosslinked with BTCA for use as 'green' resin. The advantage of using industrially pregelatinized starch instead of native starch was the complete and easy gelatinization of starch ensuring maximum reaction, formation of a smooth film as well as a shorter blending time as compared to native starch. Complete gelatinization (and associated loss of crystallinity) of the amylopectin before casting the film was identified by Lopez-Rubio et al.[7b] as an important step needed in the formation of high quality amylopectin films.

It is well known that due to the highly hydrophilic nature of the thermoplastic starch resulting from the presence of hydroxyl groups, it is susceptible to changes in the atmospheric humidity which affects the stability and mechanical properties of thermoplastic starch films. Crosslinking of starch with bi- or poly-functional reagents interconnects the starch molecules by covalent bonding, thus increasing the molecular weight and consequently the modulus (stiffness) tensile strength, as well as water resistance.[8] Polymers with hydroxyl functional groups including cellulose and polyvinyl alcohol[9], have been commonly crosslinked with dialdehydes[10], epichlorohydrin[11], dimethyloldihydroxyethyleneurea (DMDHEU)[12] or polycarboxylic acids.[13] BTCA, used in this research, is relatively inexpensive, nontoxic and is commercially available at a lower cost[12] as compared to the more commonly used crosslinkers mentioned above. The reaction conditions between WMS and BTCA were studied and optimized in the present example. Also, sodium hypophosphite ($NaPO_2H_2$, Nahyp) was used as an effective catalyst for the crosslinking reaction. It is believed that Nahyp accelerates the process of esterification by increasing the speed of the formation of the cyclic anhydride intermediate.[14a] Both BTCA and Nahyp are water soluble which enabled the reaction to be carried out in an environment friendly aqueous condition, rather than using organic solvents.

Previous studies have shown that crosslinking increases the Young's modulus of starch but makes the film extremely brittle and difficult to use.[4b] Incorporation of MFC which contains micro- and nano-fibrils with high aspect ratio was found to be a convenient and easy way to create uniform and defect-free composite films. The toughness of the composite films increased without compromising the Young's modulus as discussed later. Plasticizers such as glycerol and sorbitol (polyols) are commonly used with starch to create thermoplastic starches[7b] with improved flexibility (fracture strain) and toughness. However, plasticizers, while increasing the fracture strain of starch based resin, decrease the Young's modulus and glass transition temperatures owing to increase in the free volume in the polymer[18] as discussed later in the paper. The incorporation of MFC in the modified starch improved the toughness of the composites even without the use of plasticizers. Commercially available MFC used in this project was obtained by the mechanical shearing of cellulose fibers or paper pulp.[1, 19] Fibrils in the MFC have a high aspect ratio and many have diameters in the range of a few nanometers. They have been used for fabrication of composites with high mechanical strength owing to their high tensile strength and stiffness (Young's modulus).[1, 19-20] While crosslinking of starch ensured decreased moisture absorption and increased stability of starch against disintegration in water, a small amount of MFC (15% with respect to starch weight) was effectively used to create a composite film with high toughness and tensile strength. Thus, through this example, a convenient, completely green, nontoxic and water based process has been developed for engineering composite films with potential commercial applications such as packaging and coating in this research. The crosslinked starch may also be used in other composites.

Experimental Procedure

Materials

Instantenized and water soluble, pharmaceutical grade waxy maize starch (WMS) powder was obtained from Nutra Bio (Middlesex, N.J.). Analytical grade BTCA and Nahyp were purchased from Sigma Aldrich (Saint Louis, Mo.). MFC in water (KY-100G) was obtained in the form of paste from Dicel Chemical Industries, Japan, containing 10% MFC and 90% water.

Fabrication of Films

Fabrication of Crosslinked WMS Based Films:

In order to obtain crosslinked WMS resin, starch powder (20 g) was added to 500 ml water while being stirred using a magnetic stirrer. The powder was easily soluble in water and resulted in a low viscosity, homogeneous and transparent solution. To ensure maximum possible gelatinization the mixture was heated at 90° C. for 30 minutes with continued stirring. Predetermined BTCA weights (5%, 10%, 15% and 25% based on the weight of starch) were added, separately, to the gelatinized starch followed by addition of Nahyp (50% by weight of BTCA) as catalyst. The mixture was precured by stirring continuously for 60 min at 90° C. with a magnetic stirrer. Both BTCA and Nahyp are completely soluble in water, the heating and stirring ensured homogeneous mixing of these materials making the functional groups easily accessible for further reaction. After cooling, the precured starch was cast to form thin films on Teflon® coated glass plates and dried in an oven for 48 hours at 40° C. The precured solution had low viscosity, flowed easily and could be conveniently cast into relatively defect-free, transparent films. The dried films were peeled off from the Teflon® coated plates (18 cm×30 cm) and stored in sealed polyethylene bags. The precured films were further heated in Carver Hydraulic hot press (model 3891-4PROA00, Wabash, Ind.) for complete crosslinking (curing) at 120° C. under a pressure of 0.1 MPa for 20 min. The films were easily washed by soaking in water, followed by ultrasonication for 1 hour to get rid of all the excess unreacted chemicals. The films were further washed by soaking overnight for complete washing. After which, the films were taken out of water, dried completely and characterized. It was important to thoroughly wash off the unreacted BTCA and Nahyp as they are hygroscopic (absorb water) and can act as plasticizer if they remain trapped in the specimen. Presence of unreacted chemicals can potentially distort the mechanical property data of the films.

Fabrication of Crosslinked WMS Resin Based Composite Films:

To obtain crosslinked WMS resin based composite films a dispersion of MFC in gelatinized starch was prepared by adding predetermined weights of WMS, MFC paste and sorbitol to 500 mL water and stirring with a high speed mechanical stirrer at 90° C. for 1 hr. The stirring speed had to be increased from 600 rpm to 1100 rpm at higher loadings of MFC to prevent fibril clustering. This was followed by the addition of 5 g BTCA and 2.5 g Nahyp and the entire mixture was precured at 90° C. for 1 hr while stirring it at high speed. The mixture was cast on Teflon® coated glass plates to form films. The films were dried as described earlier followed by curing at 120° C. for 20 min leading to the formation of the MFC-crosslinked WMS composite films. The composite films were washed following the same procedure described earlier for the crosslinked films.

Fabrication of MFC-BTCA Films:

In order to investigate the interaction of BTCA with MFC a film was fabricated with MFC and BTCA. To prepare the film, MFC paste (15 g) was dispersed in water using high speed mechanical stirring. BTCA (25% by weight of MFC) was added. The mixture was precured at 90° C. for one hour to ensure complete dispersion. The film was cast on Teflon® coated glass plates, cured at 120° C. for 20 minutes and washed following the same procedure described above.

Attenuated Total Reflectance-Fourier Transform Infrared (ATR-FTIR) Analysis:

ATR-FTIR spectra were collected using a Nicolet Magna 560 FTIR spectrometer with a split pea accessory for ATR. Each scan was an average of 150 scans recorded from 4000 $cm^{-1}$ to 550 $cm^{-1}$ wavenumbers obtained at a resolution of 4 $cm^{-1}$.

In order to construct a calibration curve from the ATR-FTIR spectra, the absorption peak at 1725 $cm^{-1}$ resulting from ester carbonyl (C=O) stretching vibration was chosen as the analyte peak which monitored the concentration of ester. Since the absorption due to aliphatic —C—H stretching vibration, at 2929 $cm^{-1}$, remains unchanged after the crosslinking reactions, it was chosen as the reference peak for the internal standard. The ratio of absorbance to the analyte peak and the reference peak was plotted against concentration of BTCA. This method is similar to the calibration method used by Coma et al.[13] to assess the degree of crosslinking of cellulose with citric acid.

Scanning Electron Microscopy (SEM):

WMS starch powder, MFC, BTCA-MFC film, fracture surface of crosslinked WMS resin and the surface topographies of MFC-WMS (crosslinked) composites fractured in tensile mode, were characterized using LEO 1550 field emission SEM. The specimens were placed on standard aluminum specimen mounts (pin type) with double-sided adhesive electrically conductive carbon tape (SPI Supplies, West Chester, Pa.). The specimens were coated with carbon using Denton vacuum coater, (model BTT IV, Denton Vacuum, Moorestown, N.J.). The coated specimens were then observed on the SEM using an accelerating voltage of 5 kV to observe the surface topography and characterize their fracture behavior.

Determination of Swelling Power:

The swelling power of crosslinked starch specimens in DMSO was obtained by using the modification of a method demonstrated by Zhou et al.[21] The crosslinked starch films were conditioned in 21° C. and 65% relative humidity for 2 days prior to soaking in 10 mL DMSO at room temperature for 24 hr. The films were accurately weighed ($m_d$) before immersing in DMSO. The swollen films were filtered out from the solvent, washed with water and ethanol, wiped lightly and weighed ($m_s$). The swelling power values for crosslinked WMS in DMSO were calculated as follows:

$$\text{Swelling Power} = \frac{m_s - m_d}{m_d} \qquad \text{Equation 1}$$

Swelling power of crosslinked WMS in water was also determined using a modification of the method described above for DMSO. The crosslinked starch films were conditioned in 21° C. and 65% relative humidity for 2 days prior to soaking in 50 mL water, films were accurately weighed ($m_d$) before immersing in water. The films were soaked for 3 days in water instead of 1 day (to reach equilibrium) keeping all the other experimental conditions exactly the same. The swollen films were wiped lightly using Kimwipes® and weighed ($m_s$). The swelling power of the crosslinked films in water was calculated using the same equation given for DMSO.

Thermogravimetric Analysis (TGA)

Native and crosslinked WMS as well as composite specimens were scanned from 25° C. to 600° C. using a thermogravimetric analyzer (TGA-2050, TA Instruments, Inc., New Castle, Del.) at a rate of 10° C./min in nitrogen atmosphere to characterize their thermal stability and degradation behavior.

Tensile Testing

The WMS resin and composite films were cut into rectangular pieces of dimensions to characterize their tensile properties. To confirm that the tensile properties were isotropic, the rectangular films for tensile testing were cut randomly in different directions from the original film (18 cm×30 cm). The film thickness (approximately 0.3 mm) varied with the specimen and was measured accurately before the tensile testing. The composite films with higher loading of MFC were thicker. The films were conditioned for 3 days at ASTM standard conditions of 65% relative humidity 21° C. temperature prior to testing. The tensile properties of resin and composite films were characterized using Instron, model 5566 (Instron Co., Canton, Mass.), according to ASTM D882-02. A gauge length of 30 mm and a strain rate of 0.6 min$^{-1}$ were used for all specimens. At least 5 specimens were tested to obtain the average values.

Results and Discussions

Attenuated Total Reflectance-Fourier Transform Infrared (ATR-FTIR) Analysis

Figure 9A:
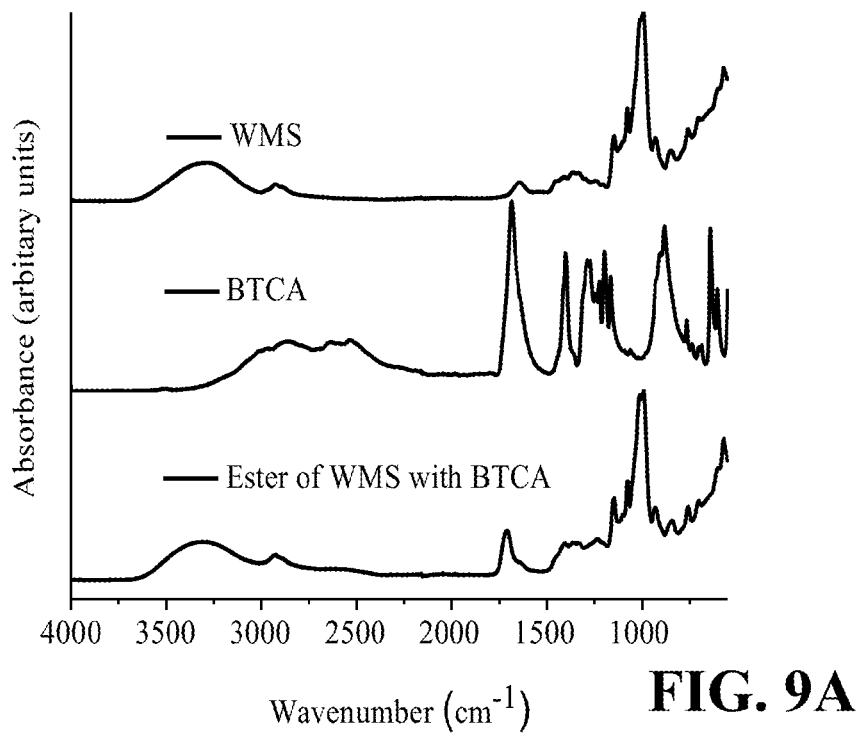
FIGS. 9A-9B are graphs showing FTIR of WMS, BTCA and ester of WMS formed with BTCA (FIG. 9A) and the extent of esterification of WMS as a function of initial BTCA content, using the internal calibration curve (FIG. 9B).

To confirm the esterification reaction between WMS and BTCA, ATR-FTIR spectra comparing WMS, BTCA and ester of WMS formed with BTCA were collected and are presented in FIG. 9A. The ATR-FTIR spectrum of BTCA presented in FIG. 9A shows a sharp peak at 1689 cm$^{-1}$ assigned to the carboxyl carbonyl stretching. Native WMS does not show any carbonyl peak while, WMS reacted with BTCA shows the ester carbonyl peak at 1725 cm$^{-1}$. The crosslinking proceeds through esterification via formation of a cyclic anhydride intermediate, aided by the catalyst Nahyp, the reaction mechanism being similar to cellulose crosslinking with BTCA shown by Yang.[22] Starch esterified with carboxylic acids typically show ester carbonyl peak at around 1725 cm$^{-1}$. FTIR of corn starch crosslinked with citric acid showed an ester peak at 1724 cm$^{-1}$ [8] while potato starch esterified with ferulic acid showed as ester peak at 1726 cm$^{-1}$.[23]

Figure 9B:
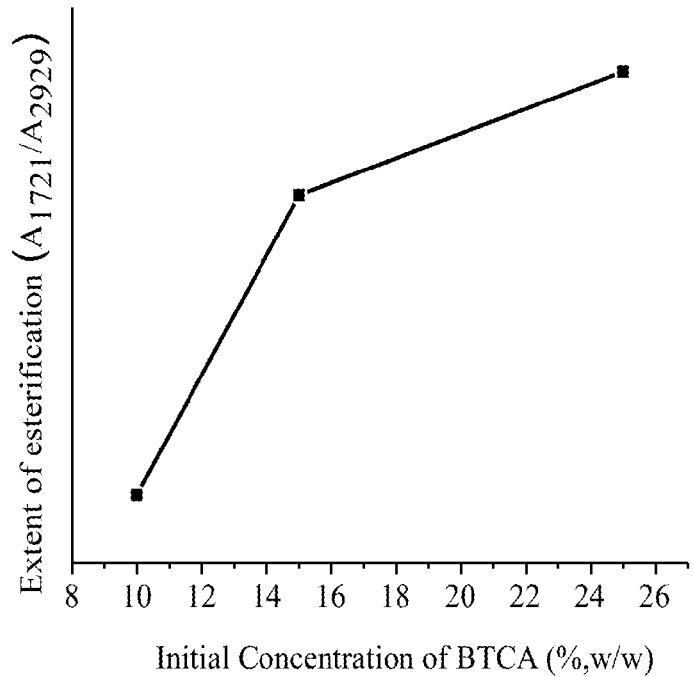

FIG. 9B illustrates the extent of esterification of WMS as a function of initial BTCA content, using an internal calibration curve. The internal calibration curve (FIG. 9B) was constructed by the method shown previously by Ghosh Dastidar and Netravali[4b] for crosslinking of native starches with malonic acid. A gradual increase in the $A_{1725}$ (absorbance of the ester carbonyl stretch)/$A_{2929}$ (absorbance of aliphatic stretching) ratio, implied an increase in the extent of esterification reaction with increase in the initial BTCA concentration. Recent studies by Coma et al.[13] have shown that $A_{1725}/A_{2929}$ ratio is linearly related to the percentage of crosslinking of cellulose with citric acid, calculated by a chemical titration method. An increase in the internal calibration curve indirectly indicates an increase in the degree of substitution (and crosslinking) with BTCA, similar to research results reported by Ghosh Dastidar and Netravali[4b] and Coma et al.[13]

The film prepared with just BTCA and MFC did not show any ester carbonyl peak after curing indicating that 120° C. is not enough for crosslinking of BTCA with MFC. Some papers have shown that higher temperatures and longer times are needed for reaction of MFC with BTCA.[17, 24] Since it was desired to specifically understand the effect of starch crosslinking, the MFC was not crosslinked with BTCA.

Swelling Power of Resin.

Figure 10:
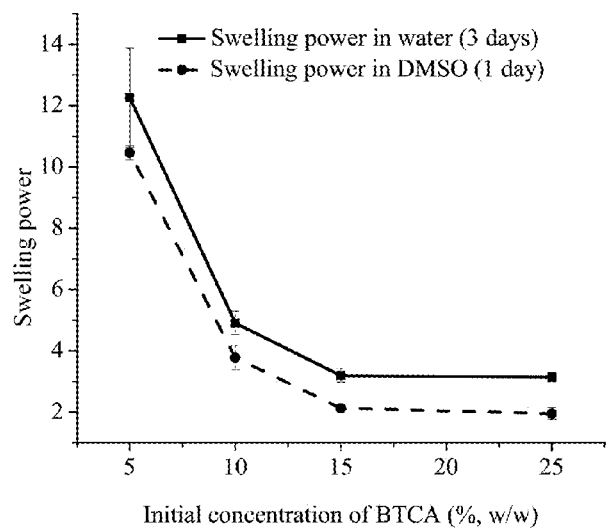
FIG. 10 is a graph showing the swelling power of WMS crosslinked with BTCA in water and DMSO as a function of BTCA concentration.
Figure 11:
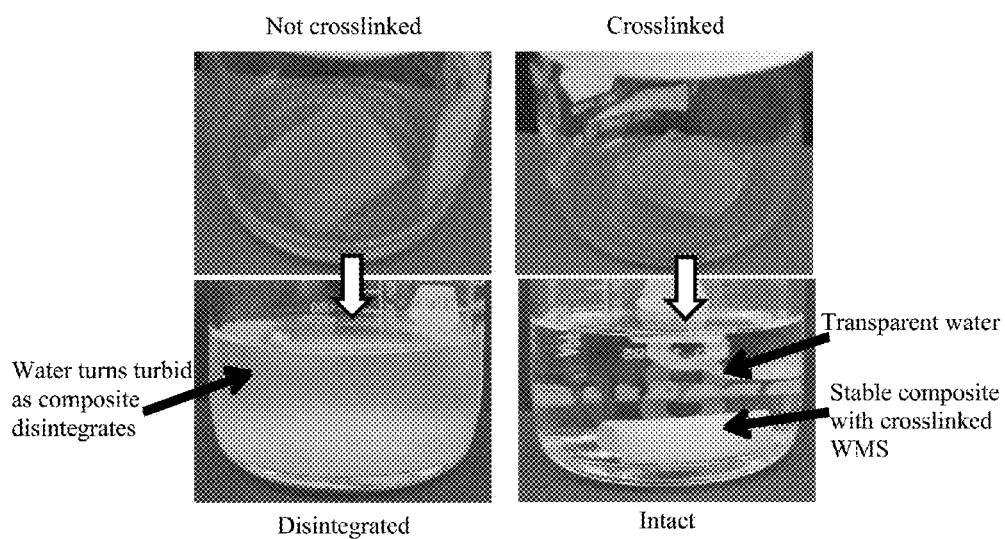
FIG. 11 shows the stability of a crosslinked composite in water.

The swelling power of WMS crosslinked with BTCA, in water and DMSO, as a function of the initial concentration of BTCA is shown in FIG. 10. The swelling power of crosslinked WMS in water and DMSO, as shown in FIG. 10, decreased as the initial concentration of BTCA (percentage of crosslinking) increased. The insolubility of WMS (esterified with BTCA) in these solvents also indirectly suggests strengthening polymer network by crosslinking. Crosslinking leads to formation of a rigid network of gel reducing the absorption of water which does not allow it to swell. Crosslinking of starch helps in reducing the moisture sensitivity which would be important for industrial application of starch.[4a] As mentioned earlier, starch is inherently hydrophilic because of the hydroxyl groups and the absorbed moisture affects its mechanical properties as a result of plasticization. The stability of starch in water can be increased by crosslinking, which makes it potentially more useful for commercial applications. FIG. 11 shows the stability of WMS resin and composite in water. It was observed that the MFC-WMS (gelatinized but not crosslinked) composites rapidly disintegrated in water while the MFC-crosslinked WMS composites only swelled in water but remained stable and retained their original shape even after continuously shaking for several months as can be seen from FIG. 11. It can be concluded that crosslinking increases the stability of the resin (and subsequent composite) in water due to formation of network structure.

MFC-WMS Composite Films

Mechanical Properties

Figure 12:
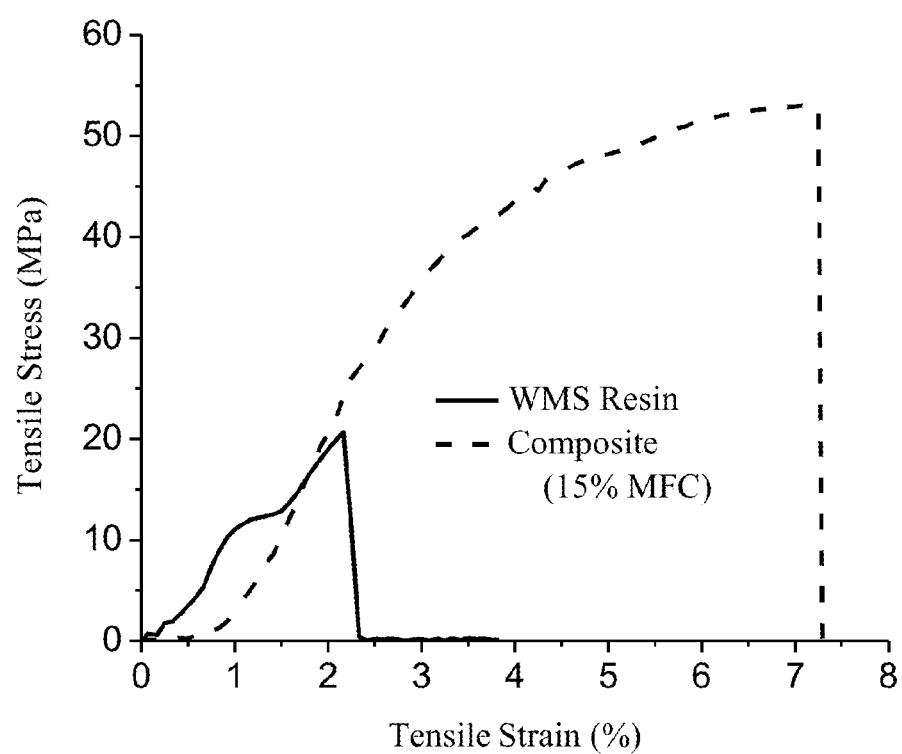
FIG. 12 is a graph showing the tensile properties of WMS resin and composite.

A strong interfacial adhesion is expected between WMS and MFC as a result of the chemical match between the two and strong hydrogen bonding resulting from the hydroxyl groups. A good H-bonding interaction is also expected between MFC and BTCA (crosslinker) due to the presence of four carboxylic acid groups which make BTCA hydrophilic. In addition, as shown by Huang and Netravali[20], MFC has a broad size distribution in terms of the fibril diameter and the small diameters of the nanofibrils. Along with its high aspect ratio MFC provides a significantly large area for the interfacial interaction. This strong interfacial interaction increases the load transfer efficiency from broken to intact fibers in the composites, reduces the critical length required for effective load transfer and, thus, increases the mechanical properties.[20, 25] The native WMS films and crosslinked WMS films (both without MFC) were too brittle and hence could not be tensile tested. The crosslinked films also revealed numerous defects after curing. A reason for defect formation in this method could be that internal stresses are caused during the curing process. Other influences are the existence of cracks or uneven geometries of the sample. These influences, however, were easily mitigated by incorporation of MFC in the sample manufacturing. The resulting composite films were relatively defect-free and were easily cured without developing cracks and wrinkles MFC (15% MFC)-crosslinked WMS composite films exhibited excellent mechanical properties with high stiffness and toughness (Young's modulus of 2341 MPa, fracture strain of 3.1% and fracture stress of 39 MPa), even without the use of any plasticizer. The hydrophilicity of the MFC fiber network makes the film sufficiently ductile to be tensile tested without the use of any plasticizer. However, it should be noted that even though MFC is hydrophilic it is highly crystalline in nature and hence does not allow it to absorb a significant amount of moisture.[20] Due to the similarities of the chemical structure of starch and cellulose, incorporation of MFC is an environment friendly and facile way for fabrication of smooth, defect-free, flexible films that are easier to handle and do not need any plasticizers. The strengthening of network structure and reduction in moisture absorption (as observed from the swelling power data) due to crosslinking of the WMS resin with BTCA also contributed to the higher modulus of the composites. FIG. 12 shows typical stress vs. strain plots for WMS resin (not crosslinked, no MFC) and MFC (15%)-WMS (crosslinked) composite, both containing 5% sorbitol as plasticizer. Clearly the MFC reinforced composite showed a higher toughness than WMS resin, as was expected. Plasticizers such as glycerol and sorbitol (polyols) absorb moisture which increases the free volume within the polymer and reduce their glass transition temperature. This, in turn, results in lower Young's modulus and higher fracture strain values as well as reduction in brittleness and increase in toughness.[7b] It should be emphasized, that incorporation of MFC, instead of polyol based plasticizers, increased the fracture strain without compromising the Young's modulus. Thus, MFC is a potential environment friendly substitute for glycerol and sorbitol in fabricating crosslinked starch based films. The fracture stress, fracture strain and toughness data are presented in Table 2 and show significant improvement with crosslinking and subsequent incorporation of MFC. Addition of 5% sorbitol to the crosslinked MFC (15%)-WMS composite film, however, decreased the Young's modulus from 2341 MPa to 1686 MPa. The reduction in Young's modulus with plasticizer was expected. As mentioned earlier, it was not possible to conduct tensile tests on crosslinked WMS resin films (without MFC) even after adding 5% sorbitol owing to the brittleness of the films as well as experimental difficulty in fabricating defect-free films. Hence, no data could be collected for pure crosslinked WMS resin films.

TABLE 2

Mechanical properties of WMS and MFC-WMS (crosslinked) composites as a function of sorbitol (%).

| MFC (%) | Sorbitol (%) | Modulus (MPa) | Fracture Stress (MPa) | Fracture Strain (%) | Toughness (MPa) |
|---|---|---|---|---|---|
| 0 | 5 | 1354 (50) | 17.6 (65) | 3.1 (37) | 0.4 (90) |
| 15 | 0 | 2341 (32) | 39 (20) | 3.1 (29) | 0.7 (47) |
| 15 | 2.5 | 1679 (6) | 45 (25) | 10 (43) | 3.3 (74) |
| 15 | 5 | 1686 (40) | 44 (33) | 7.8 (32) | 2.3 (44) |

Table 3 provides mechanical properties for MFC-WMS (crosslinked) composites as a function of MFC content. It is evident from data presented in Table 3 that Young's modulus increases with increase in MFC content from 15% to 50% (2.5% sorbitol). As mentioned earlier, this is because the cellulose fibrils are known to possess very high Young's modulus of up to 140 GPa owing to their high degree of molecular orientation and highly crystalline nature.[1, 10] In addition, MFC also forms strong hydrogen bonding with the starch resin leading to higher interfacial adhesion which also contributes to the higher Young's modulus and fracture stress.[25] The tensile properties of the MFC reinforced composites were also completely isotropic which can be attributed to the network structure of the MFC fibrils as revealed in the SEM images (discussed later).

TABLE 3

Mechanical properties of MFC-crosslinked WMS composites as a function of MFC loading.

| MFC (%) | Sorbitol (%) | Modulus (MPa) | Fracture Stress (MPa) | Fracture Strain (%) | Toughness (MPa) |
|---|---|---|---|---|---|
| 15 | 2.5 | 1679 (6) | 45 (35) | 10 (43) | 3.3 (74) |
| 25 | 2.5 | 1737 (8) | 56.5 (21) | 6 (35) | 2.3 (58) |
| 35 | 2.5 | 2207 (16) | 58 (16) | 7 (33) | 2.9 (51) |
| 50 | 2.5 | 2566 (12) | 63 (15) | 7.6 (38) | 3.5 (52) |

The properties of MFC-crosslinked starch based composites were comparable or in some cases higher than petroleum based polymers such as nylon-6 (Young's modulus: 1800 MPa; fracture stress: 70 MPa).

Microscopic Analysis

Figure 13A:
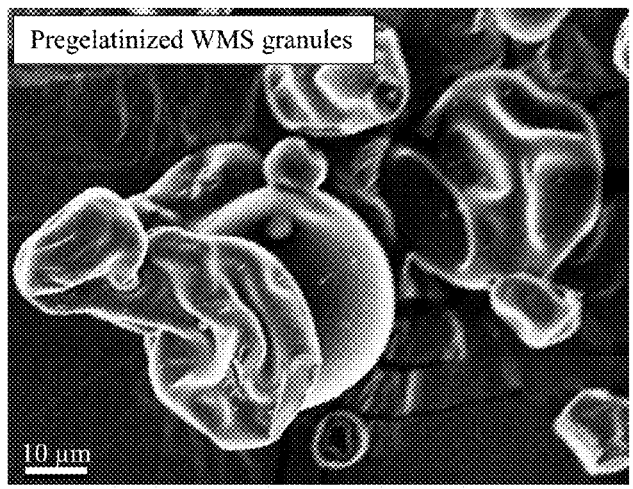
FIGS. 13A-13B are SEM images of pregelatinized WMS granules (FIG. 13A) and MFC fibers (FIG. 13B).
Figure 13B:
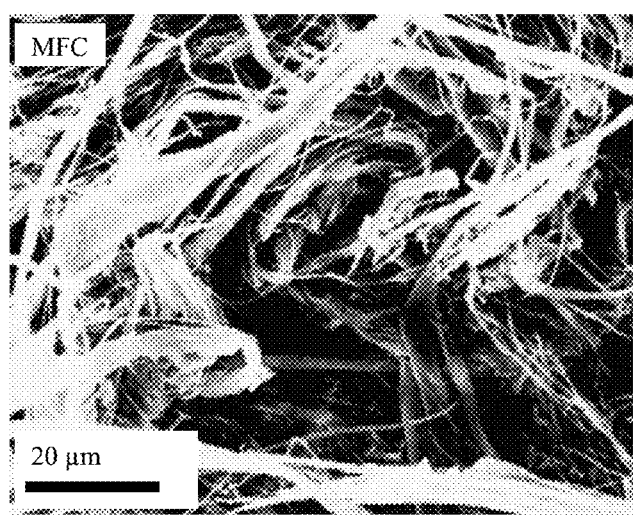

FIG. 13A shows SEM images of pregelatinized WMS granules as is obtained from the vendor. The collapsed granules of industrially pregelatinized and instantenized WMS, used in the present study, dissolved easily in water at 90° C. and formed a homogeneous transparent solution. It was possible to uniformly disperse MFC in the solubilized WMS by mechanically stirring at high shear rate to ensure that no aggregates were formed. Lopez-Rubio et al.[7b] have reported that the formation of high quality amylopectin films is dependent on the full gelatinization (and associated loss of crystallinity) of the amylopectin before casting the film. FIG. 13B shows SEM image of MFC fibers.[1] From the SEM image, it is clear, that the MFC is a mixture of fibrils with broad range of distribution of the diameters, including both micro sized and nano sized fibrils.[1]

Figure 14A:
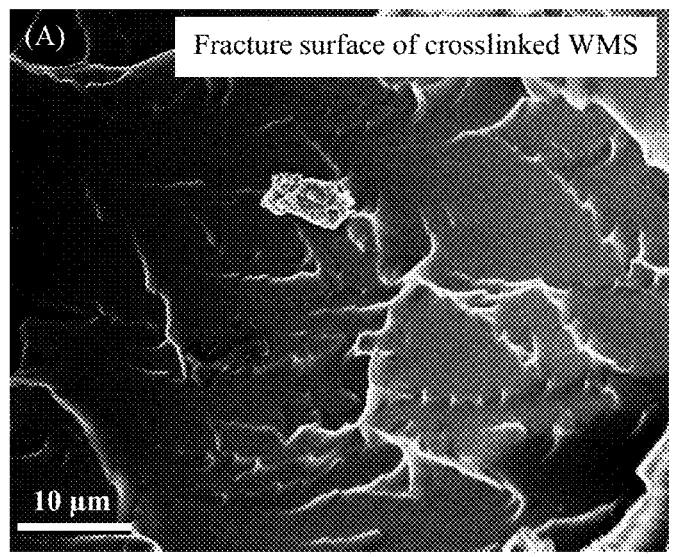
FIGS. 14A-14C are SEM images of fracture surface of crosslinked WMS (FIG. 14A); BTCA wetting MFC network (FIG. 14B); and a schematic of MFC-WMS composite showing the network structure of MFC incorporated in starch based resin (FIG. 14C).

FIG. 14A shows the SEM image of the fracture surface of crosslinked WMS resin. The SEM image of crosslinked WMS, not reinforced with MFC, showed a smooth fracture surface, as expected for a brittle fracture for resins such as epoxies.[26]

Figure 14B:
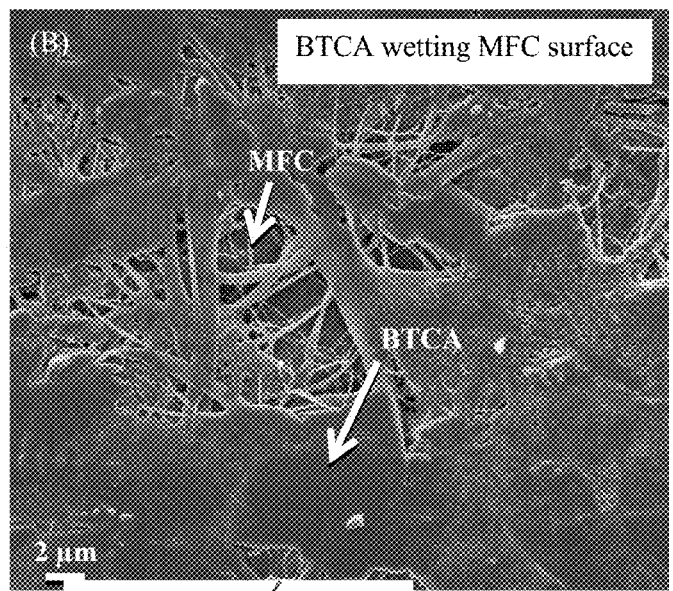
Figure 14C:
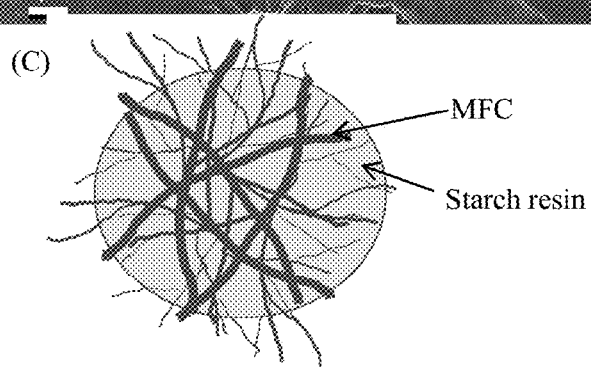

FIG. 14B shows the SEM image of the film prepared by curing BTCA with MFC. The image clearly shows that BTCA spreads on the surface of the network structure of MFC. This may be attributed to the strong H-bonding interaction between the hydroxyl groups in MFC and the four carboxylic acid groups in BTCA. It is expected that the strong interaction between the reinforcing filler and the crosslinker also contributes to the higher tensile properties of the composites. As explained earlier, no crosslinking reaction was observed between BTCA and MFC at 120° C. The random network and branched structure of MFC in FIG. 14C also accounts for the isotropic properties of the composites.

Figures 15A, 15B, 15C:
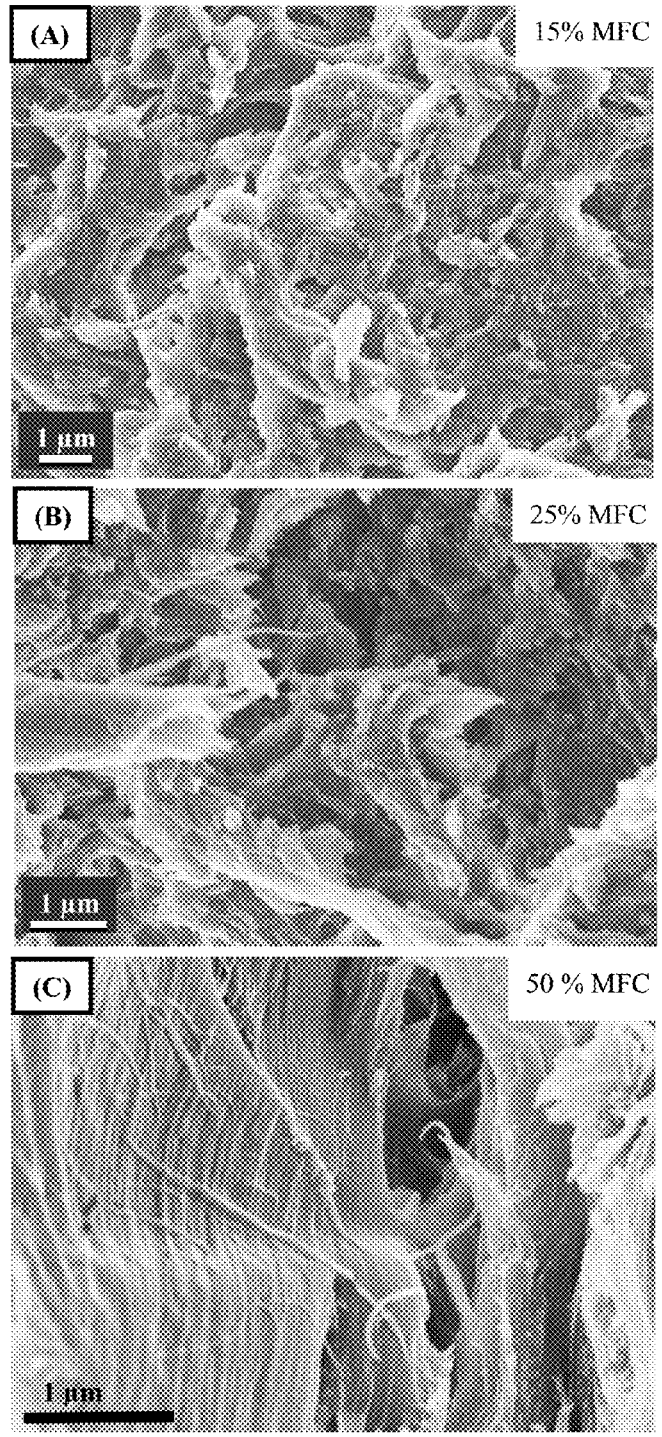
FIGS. 15A-15C are SEM images of MFC-WMS crosslinked composites with 15% MFC (FIG. 15A), 25% MFC (FIG. 15B), and 50% MFC (FIG. 15C).

FIGS. 15A-15C show the SEM images of typical fracture surfaces of MFC-WMS crosslinked composites, failed in tension. The fracture surfaces of MFC-WMS crosslinked composites, showed surface roughness due to incorporation of MFC, rather than a smooth fracture surface of the brittle resin. The images show a close association between the fiber and the resin. Owing to similar chemical compositions of starch and cellulose, significant hydrogen bonding is expected between the two. The fiber (MFC)-resin (crosslinked WMS) interaction plays a significant role in improving the mechanical properties of the composites.[26-27] The SEM images showed that the MFC fibrils were embedded into the starch resin to a large extent. The surface topography of composite with 50% MFC is distinctly different from the composites incorporated with 15% and 25% MFC. It is assumed, that as the loading of MFC increased to 50%, MFC became one of the dominant phases rather than reinforcing filler, with the crosslinked WMS resin occupying the voids within the porous MFC network. It was difficult to draw any definite conclusion about the dispersion of the fibers from the SEM images.

Thermal Properties

Figure 16:
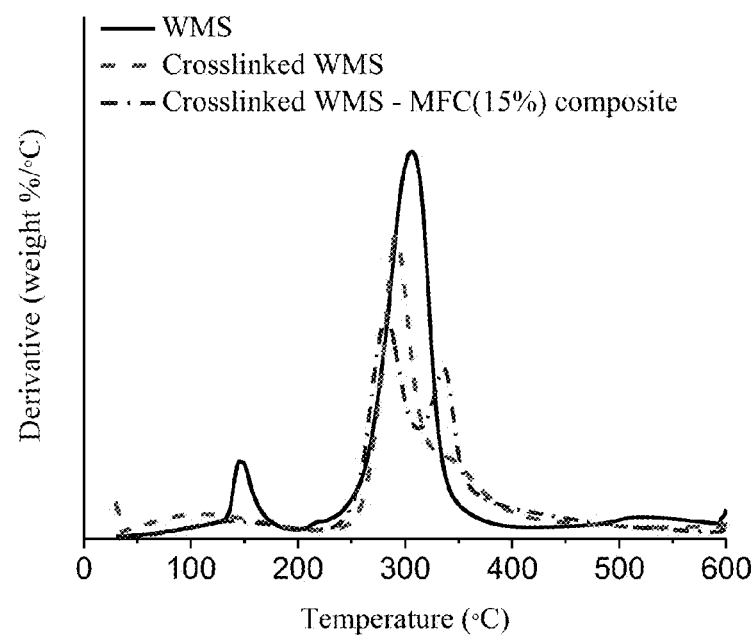
FIG. 16 is a graph showing DTGA of WMS, crosslinked WMS, and MFC (15%)-crosslinked WMS composite.

The DTGA plots, constructed from the TGA plots, in FIG. 16 show that gelatinized WMS and crosslinked WMS resins as well the composite start to degrade at about the same temperature (≈270° C.). There was around 90% weight loss at 600° C. in the case of gelatinized WMS (not crosslinked) resin compared to 70% weight loss observed for the crosslinked WMS resin. WMS already had a high initial thermal degradation temperature which did not change on crosslinking. The DTGA plot for MFC (15%)-crosslinked WMS composite showed a two stage thermal degradation for the composite. This is confirmed by the two sharp peaks observed in the DTGA curve at around 270° C. and 300° C. The peak observed around 270° C. for the crosslinked MFC-WMS composites is same as that observed for the WMS resin and represents the onset of resin degradation. The peak (at ≈300° C.) corresponds to the degradation of MFC, which is thermally more stable than crosslinked WMS.[1, 20] These results suggest that there was only slight enhancement in thermal degradation properties on incorporation of MFC possibly because the fibrils stay as a separate phase in the composites and also because the difference between their degradation temperature is not so significant as in the case of clay particles.

Conclusions

Crosslinked waxy maize starch based environment friendly composites reinforced with MFC were fabricated using a facile, easy method. BTCA, a nontoxic, water soluble, carboxylic acid, was used to crosslink WMS. Crosslinking reduced the water sensitivity and led to a decrease in swelling power of the WMS films in both water and DMSO. The stability of the films in water also increased after crosslinking MFC was added as a reinforcing constituent to enhance the mechanical properties of the WMS resin. Incorporating MFC increased Young's modulus, fracture stress without sacrificing the fracture strain. As a result, the fracture toughness of the composite was several times higher than the resin without MFC. The increased mechanical properties were a result of the high mechanical properties (Young's modulus and fracture stress) of the MFC as well as the chemical similarities between starch and cellulose resulting in high level of hydrogen bonding. Sorbitol, a plasticizer added to reduce the brittleness of the composites led to a decrease in the modulus of the composite films as could be expected. Incorporation of MFC, on the other hand, proved to be a benign way to improve the flexibility of the film without compromising other tensile properties including Young's modulus. The 'green' crosslinked starch can potentially replace petroleum based resins. However, in the present example, no conclusion was drawn on the effect of MFC dispersion and interfacial interaction on the composite properties. Characterization of the interfacial interaction of these composites is an important future research.

REFERENCES

Citation of a reference herein shall not be construed as an admission that such reference is prior art to the present invention. All references cited herein are hereby incorporated by reference in their entirety. Certain references are cited by author and date, while other references are denoted by superscripted numerals. Below is a listing of various references cited herein, with the references being identified by author, date, publication, and page numbers:

I. Arvanitoyannis et al., (1994), Carbohydrate Polymers, 24(1), 1-15;
A. S. Ayoub et al., (2009), Journal of Plastic Film & Sheeting, 25(1), 25-45;
R. Bhosale et al., (2006), Carbohydrate Polymers, 66(4), 521-527;
S. Chabba et al., (2005), Journal of Material Science, 40(23), 6263-6273;
Y. X. Chen et al., (2006), Journal of Applied Polymer Science, 102(2), 1539-1546;
V. Coma et al., (2003), Carbohydrate Polymers, 51(3), 265-271;
X. Du et al., (2007), Starch-Stärke, 59(12), 609-613;
J. M. Fang et al., (2002), Carbohydrate Polymers, 47(3), 245-252;
S. Garg et al., (2011), Carbohydrate Polymers, 83(4), 1623-1630;
A. Imberty et al., (1988), Biopolymers, 27(8), 1205-1221;
A. N. Jyothi et al., (2006), Starch-Starke, 58(6), 292-299;
C. Lan et al., (2010), Macromolecular Materials and Engineering, 295(11), 1025-1030;
G. J. Mao et al., (2006), Journal of Applied Polymer Science, 102(6), 5854-5860;
S. Mathew et al., (2007), Food Chemistry, 105(2), 579-589;
S. Mathew et al., (2008), Food Hydrocolloids, 22(5), 826-835;
S. Mishra et al., (2006), Food Hydrocolloids, 20(5), 557-566;
S. C. Pang et al., (2011), Carbohydrate Polymers, 84, 424-429;
I. Pashkuleva et al., (2008), Macromolecular Bioscience, 8(2), 210-219;
I. Pashkuleva et al., (2005), Journal of Materials Science-Materials in Medicine, 16(1), 81-92;
L. Passauer et al., (2009), Starch-Starke, 61(11), 621-627;
N. Reddy et al., (2009), Biotechnology and Bioengineering, 103(5), 1016-1022;
N. Reddy et al., (2010), Food Chemistry, 118(3), 702-711;
M. I. Santos et al., (2009), Journal of Materials Chemistry, 19(24), 4091-4101;
O. Sauperl et al., (2010), Textile Research Journal, 80(4), 383-392;
C. Seidel et al., C., (2001), Starch, 53(7), 305-310;
N. Singh et al., (2004), Food Chemistry, 86(4), 601-608;
J. J. G. vanSoest et al., (1997), Journal of Macromolecular Science-Pure and Applied Chemistry, A34(9), 1665-1689;
Y. X. Xu et al., (2004), Cereal Chemistry, 81(6), 735-740;
C. Q. Yang et al., (2002), Textile Research Journal, 72(9), 817-824;
Y. H. Yun et al., (2008), Journal of Polymers and the Environment, 16(1), 12-18;
S. D. Zhang et al., (2010), Journal of Polymer Research, 17(1), 43-51;

J. Zhou et al., (2008), *Carbohydrate Polymers*, 74, 405-410;
J. F. Zhu et al., (2007), *Polymer-Plastics Technology and Engineering*, 46(10-12), 1135-1141;
H. F. Zobel, (1988), *Starch-Starke*, 40(1), 1-7;
1. X. Huang et al., *Compos Sci Technol* 2009, 69, 1009-1015.
2. E. S. Stevens, Biocycle 2002, 43 (12), 42-45.
3. S. Chabba et al., *Green Chem* 2005, 7 (8), 576-581.
4. (a) T. Ghosh Dastidar et al., *Journal of Biobased Materials and Bioenergy* 2012, 2009 (1), 1-124; (b) T. Ghosh Dastidar et al., T.; *Carbohyd Polym* 2012, 90, 1620-1628.
5. X. Du et al., *Starch-Stärke* 2007, 59 (12), 609-613.
6. H. Kumar et al., *Journal of Adhesion Science and Technology* 2010, 24, 217-236.
7. (a) P. Myllarinen et al., *Carbohyd Polym* 2002, 50 (4), 355-361; (b) A. Lopez-Rubio et al., *Carbohyd Polym* 2007, 68 (4), 718-727; (c) D. Plackett et al., *J Appl Polym Sci* 2010, 117 (6), 3601-3609.
8. N. Reddy et al., *Food Chemistry* 2010, 118 (3), 702-711.
9. E. Chiellini et al., *Biomacromolecules* 2008, 9 (3), 1007-1013.
10. K. Qiu et al., *Composites Science & Technology* In Press, 2012.
11. (a) G. Hamdi et al., *Journal of Microencapsulation* 2001, 18 (3), 373-383; (b) G. E. Hamerstrand et al., *Cereal Chemistry* 1960, 37 (4), 519-524.
12. C. Q. Yang et al., *Text Res J* 2002, 72 (9), 817-824.
13. V. Coma et al., *Carbohyd Polym* 2003, 51 (3), 265-271.
14. (a) C. Q. Yang, *J Appl Polym Sci* 1993, 50 (12), 2047-2053; (b) C. Q. Yang et al., *Ind Eng Chem Res* 1996, 35 (11), 4037-4042.
15. X. F. Ma et al., *Biomacromolecules* 2008, 9 (11), 3314-3320.
16. C. Q. Yang et al., *J Polym Sci Pol Chem* 1997, 35 (3), 557-564.
17. (a) O. Sauperl et al., *Text Res J* 2010, 80 (4), 383-392; (b) C. Q. Yang et al., *Text Res J* 2000, 70 (7), 615-620.
18. J. T. Kim et al., *J Agr Food Chem* 2010, 58 (9), 5400-5407.
19. K. Qiu et al., *Composites Science & Technology* 2012, 72 (13), 1588-1594.
20. X. Huang et al., *Journal of Macromolecular Science, Part A: Pure and Applied Chemistry* 2008, 45, 899-906.
21. J. Zhou et al., *Carbohydrate Polymers* 2008, 74, 405-410.
22. C. Q. Yang, *Text Res J* 2001, 71 (3), 201-206.
23. S. Mathew et al., *Food Chemistry* 2007, 105 (2), 579-589.
24. C. E. Morris et al., *Ind Eng Chem Res* 1996, 35 (3), 950-953.
25. P. Lodha et al., *J. Mater. Sci.* 2002, 37, 3657-3665.
26. A. N. Netravali et al., *Polymer Composites* 1989, 10, 226-241.
27. Y. Yamamoto et al., *Composite Interfaces* 2007, 14 (7), 699-713.

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed is:

1. An enhanced starch resin composition comprising a native starch and/or a waxy starch crosslinked with a multi-functional polycarboxylic acid, wherein the starch resin composition is formed by a water-based reaction comprising using a non-toxic, water-soluble catalyst to catalyze esterification of the native starch and/or the waxy starch with the multi-functional polycarboxylic acid, thereby yielding a crosslinked starch resin composition having at least one enhanced mechanical property and/or reduced moisture absorption as compared to the native starch and/or the waxy starch, wherein the enhanced starch resin composition is in the form of a nanocomposite.

2. The enhanced starch resin composition according to claim 1, wherein the native starch and/or waxy starch is present in an amount ranging between about 50 percent (%) and about 100% by weight.

3. The enhanced starch resin composition according to claim 1, wherein the native starch and/or waxy starch is from a plant source selected from the group consisting of a cereal, a tuber, and combinations thereof.

4. The enhanced starch resin composition according to claim 3, wherein the cereal is selected from the group consisting of maize, rice, wheat, sorghum, and combinations thereof.

5. The enhanced starch resin composition according to claim 3, wherein the tuber is selected from the group consisting of potato, sweet potato, tapioca, yam, cassava, and combinations thereof.

6. The enhanced starch resin composition according to claim 1, wherein the multi-functional polycarboxylic acid is present in an amount ranging between about 10% and about 50% by weight.

7. The enhanced starch resin composition according to claim 1, wherein the multi-functional polycarboxylic acid comprises a carboxylic acid having at least two carboxyl groups and is selected from the group consisting of malonic acid (MA), 1,2,3,4-butanetetracarboxylic acid (BTCA), succinic acid, glutaric acid, adipic acid, pimelic acid, oleic acid dimer, sebacic acid, suberic acid, azelaic acid, fumaric acid, 2,5-dimethyl adipic acid, cis-cyclohexane-1,2-dicarboxylic acid, trans-bicyclo [2.2.2] octane-2,3-dicarboxylic acid, trans-bicyclo [2.2.2] oct-5-ene-2,3-dicarboxylic acid, 1,14-tetradecanedicarboxy acid, 1,10-decanedicarboxylic acid, diglycolic acid, 3,3'-oxydipropionic acid, biphenyl-4,4'-dicarboxylic acid, p-phenylenedipropionic acid, pentane-1,3,5-tricarboxylic acid, benzene-1,3,5-tricarboxylic acid, and citric acid.

8. The enhanced starch resin composition according to claim 1, wherein the non-toxic, water-soluble catalyst is added to catalyze the esterification reaction in an amount ranging between about 1% and about 40% based on the dry weight of the multi-functional polycarboxylic acid.

9. The enhanced starch resin composition according to claim 1, wherein the non-toxic, water-soluble catalyst is selected from the group consisting of sodium hypophosphite monohydrate, sodium hypophosphite, sodium monobasic phosphate, and sodium trimetaphosphite.

10. The enhanced starch resin composition according to claim 1 further comprising:
an additive selected from the group consisting of a plasticizer, a reinforcement agent, and combinations thereof.

11. The enhanced starch resin composition according to claim 10, wherein the reinforcement agent is selected from the group consisting of nanoclay, microfibrillated cellulose (MFC), nanofibrillated cellulose (NFC), variety of whiskers, nanotubes, surface functionalized nanoparticles, metal oxide nanoparticles, and combinations thereof.

12. The enhanced starch resin composition according to claim 10, wherein the plasticizer is a polyol selected from the group consisting of sorbitol, glycerol, glycol, mannitol, and combinations thereof.

13. The enhanced starch resin composition according to claim 1, wherein the enhanced starch resin composition is in the form selected from the group consisting of an adhesive, a film, a protective coating for paper, food packaging, resin for impregnation for fabrics, and hard casts for fractured bones.

14. The enhanced starch resin composition according to claim 1, wherein the enhanced starch resin composition has an enhanced mechanical property as compared to the native starch and/or the waxy starch, said enhanced mechanical property being selected from the group consisting of increased Young's modulus, increased toughness, and increased fracture stress.

15. The enhanced starch resin composition according to claim 1, wherein the enhanced starch resin composition has reduced moisture absorption as compared to the native starch and/or the waxy starch.

16. A method of making an enhanced starch resin composition, said method comprising:
providing a gelatinized starch mixture comprising gelatinized native and/or waxy starch;
precuring the gelatinized starch mixture with a sufficient amount of a multi-functional polycarboxylic acid in the presence of a sufficient amount of a non-toxic, water-soluble catalyst effective to catalyze esterification of the native starch and/or the waxy starch with the multi-functional polycarboxylic acid, thereby yielding a precured starch mixture; and
curing the precured starch mixture at a sufficient temperature for a sufficient period of time to yield a crosslinked starch resin composition comprising the native starch and/or the waxy starch crosslinked with the multi-functional polycarboxylic acid,
wherein said crosslinked starch resin composition has at least one enhanced mechanical property and/or reduced absorption as compared to the native starch and/or the waxy starch, wherein the enhanced starch resin composition is in the form of a nanocomposite.

17. The method according to claim 16, wherein the sufficient temperature to cure the precured starch mixture to yield the crosslinked starch resin composition comprises between about 100° C. and about 160° C.

18. The method according to claim 16, wherein the curing step is performed at a sufficient pressure to yield a crosslinked starch resin composition that is in a form of a smooth and substantially defect-free crosslinked starch film composition, wherein the sufficient pressure is between about 0.25 MPa and about 5 MPa.

19. The method according to claim 16, wherein the sufficient time to form the crosslinked starch resin composition is a minimum of about 5 minutes and a maximum of about 120 minutes.

20. The method according to claim 16 further comprising:
drying the precured starch mixture prior to performing the curing step.

21. The method according to claim 16 further comprising:
after curing the precured starch mixture, washing the cured crosslinked starch resin composition with a sufficient amount of water for a sufficient amount of time to remove or substantially remove any non-reacted multi-functional polycarboxylic acid and non-toxic, water-soluble catalyst.

22. The method according to claim 16, wherein the native starch and/or waxy starch is provided in an amount ranging between about 50 percent (%) and about 100% by weight.

23. The method according to claim 16, wherein the native starch and/or waxy starch is from a plant source selected from the group consisting of a cereal, a tuber, and combinations thereof.

24. The method according to claim 23, wherein the cereal is selected from the group consisting of maize, rice, wheat, sorghum, and combinations thereof.

25. The method according to claim 23, wherein the tuber is selected from the group consisting of potato, sweet potato, tapioca, yam, cassava, and combinations thereof.

26. The method according to claim 16, wherein the multi-functional polycarboxylic acid is provided in an amount ranging between about 5% and about 25% by weight.

27. The method according to claim 16, wherein the multi-functional polycarboxylic acid comprises a carboxylic acid having at least two carboxyl groups and is selected from the group consisting of malonic acid (MA), 1,2,3,4-butanetetracarboxylic acid (BTCA), succinic acid, glutaric acid, adipic acid, pimelic acid, oleic acid dimer, sebacic acid, suberic acid, azelaic acid, fumaric acid, 2,5-dimethyl adipic acid, cis-cyclohexane-1,2-dicarboxylic acid, trans-bicyclo [2.2.2] octane-2,3-dicarboxylic acid, trans-bicyclo [2.2.2] oct-5-ene-2,3-dicarboxylic acid, 1,14-tetradecanedicarboxy acid, 1,10-decanedicarboxylic acid, diglycolic acid, 3,3'-oxydipropionic acid, biphenyl-4,4'-dicarboxylic acid, p-phenylenedipropionic acid, pentane-1,3,5-tricarboxylic acid, benzene-1,3,5-tricarboxylic acid, and citric acid.

28. The method according to claim 16, wherein the non-toxic, water-soluble catalyst is added to catalyze the esterification reaction in an amount ranging from about 10% and about 50% based on the dry weight of the multi-functional polycarboxylic acid.

29. The method according to claim 16, wherein the non-toxic, water-soluble catalyst is selected from the group consisting of sodium hypophosphite monohydrate, sodium hypophosphite, sodium monobasic phosphate, and sodium trimetaphosphite.

30. The method according to claim 16 further comprising:
mixing an additive with the gelatinized starch mixture prior to performing the precuring, wherein the additive is selected from the group consisting of a plasticizer, a reinforcement agent, and combinations thereof.

31. The method according to claim 30, wherein the reinforcement agent is selected from the group consisting of nanoclay, microfibrillated cellulose (MFC), nanofibrillated cellulose (NFC), variety of whiskers, nanotubes, surface functionalized nanoparticles, metal oxide nanoparticles, and combinations thereof.

32. The method according to claim 30, wherein the plasticizer is a polyol selected from the group consisting of sorbitol, glycerol, glycol, mannitol, and combinations thereof.

33. The method according to claim 16, wherein the enhanced starch resin composition is in the form selected from the group consisting of an adhesive, a film, a protective coating for paper, food packaging, resin for impregnation for fabrics, and hard casts for fractured bones.

34. The method according to claim 16, wherein the enhanced starch resin composition has an enhanced mechanical property as compared to the native starch and/or the waxy starch, said enhanced mechanical property being selected from the group consisting of increased Young's modulus, increased toughness, and increased fracture stress.

35. The method according to claim 16, wherein the enhanced starch resin composition has reduced moisture absorption as compared to the native starch and/or the waxy starch.

36. An enhanced starch resin composition produced according to the method of claim 16.

* * * * *